(12) United States Patent
Sakurai et al.

(10) Patent No.: US 8,297,710 B2
(45) Date of Patent: Oct. 30, 2012

(54) TOOTHBRUSH

(75) Inventors: Shinya Sakurai, Osaka (JP); Toyokazu Mori, Osaka (JP)

(73) Assignee: Sunstar Inc., Takatsuki-shi, Osaka (JP)

( * ) Notice: Subject to any disclaimer, the term of this patent is extended or adjusted under 35 U.S.C. 154(b) by 0 days.

(21) Appl. No.: 13/273,325

(22) Filed: Oct. 14, 2011

(65) Prior Publication Data

US 2012/0091784 A1  Apr. 19, 2012

Related U.S. Application Data

(62) Division of application No. 11/815,274, filed as application No. PCT/JP2006/301507 on Jan. 31, 2006, now abandoned.

(30) Foreign Application Priority Data

Feb. 2, 2005  (JP) .................................. 2005-026553

(51) Int. Cl.
 *A46D 1/05*  (2006.01)
(52) U.S. Cl. ............................................. 300/21; 300/6
(58) Field of Classification Search .................. 15/167.1, 15/207.2; 300/21, 4–9
 See application file for complete search history.

(56) References Cited

U.S. PATENT DOCUMENTS

| | | | |
|---|---|---|---|
| 6,021,541 A | 2/2000 | Mori et al. | |
| 6,496,999 B1 | 12/2002 | Gleason et al. | |
| 2004/0103492 A1 * | 6/2004 | Kwon et al. | 15/167.1 |

FOREIGN PATENT DOCUMENTS

| | | |
|---|---|---|
| JP | 2001-169827 A | 6/2001 |
| JP | 2003-169718 A | 6/2003 |

OTHER PUBLICATIONS

International Search Report of PCT/JP2006/301507, date of mailing May 30, 2006.
Notification of Transmittal of Translation of the International Preliminary Report on Patentability (Form PCT/IB/338) of International Application No. PCT/JP2007/050715 mailed Jul. 31, 2008 with Forms PCT/IB/373 and PCT/ISA/237.

* cited by examiner

*Primary Examiner* — Shay Karls
(74) *Attorney, Agent, or Firm* — Westerman, Hattori, Daniels & Adrian, LLP

(57) ABSTRACT

A toothbrush including a brush main body of a synthetic resin and having a bristle base and bristles of a thermoplastic resin which have been fusion-bonded to the bristle base to constitute a bristled part, the bristles constituting the bristled part at least partly comprise: tapered bristles which are bristles having split free ends, the split free ends having been tapered beforehand; tapered bristles which have a sectional shape having a core-sheath structure or islands in a sea structure; or tapered bristles in each of which a core bristle comprising a core or island part has been formed beforehand so as to be exposed at the free end. The toothbrush has excellent suitability for bristle insertion into narrow parts. It is highly effective in removing dental plaque and cleaning the teeth. It is highly easy to use in the oral cavity. It further has a highly attractive appearance.

17 Claims, 17 Drawing Sheets

(a)

(b)

(a)

(b)

(c)

(a)

(b)

(c)

(a)

(b)

(c)

(a)

(b)

(c)

TOOTHBRUSH

CROSS-REFERENCE TO RELATED APPLICATIONS

This application is a divisional application of U.S. application Ser. No. 11/815,274, filed Aug. 1, 2007, which is a National Stage Entry of PCT/JP2006/301507, filed Jan. 31, 2006, which is based upon and claims the benefit of priority of JP2005-026553, filed Feb. 2, 2005, the entire contents of which are incorporated herein by reference.

TECHNICAL FIELD

The present invention relates to a toothbrush, and more particularly to a toothbrush which is highly effective in removing dental plaque and cleaning teeth, and which is highly easy to use in an oral cavity and further has a highly attractive appearance.

BACKGROUND ART

Heretofore, as toothbrushes with enhanced effects of removing dental plaque and cleaning the teeth of narrow portions such as the gaps between neighboring teeth and gaps between the teeth and the gums, a large number of toothbrushes have been proposed with the bristle free end processed into a tapered shape to increase the suitability for bristle insertion into narrow portions. For example, there proposed are various kinds of toothbrushes that have tapered bristles with the bristle free ends tapered, such as a toothbrush which has a tapered shape in which a brush diameter at each portion of a predetermined length from the tapered portion free end portion of the synthetic monofilament achieves a predetermined ratio with respect to the brush diameter at the base in the toothbrush formed by bending synthetic monofilaments with tapered portions on both ends from the center portion and bundling and implanting them in tuft holes as a brush (see Patent Document 1), a toothbrush formed by bending filament bristle tufts in a U-shape and implanted in tuft holes of the brush head by anchor has the shapes of both free ends of the filament varied with one end of the filament formed in a sphere and the other end in a tapered shape, and furthermore, a toothbrush with one end of the filament implanted protrudably from the other free end (see Patent Document 2), a toothbrush that has long tapered bristles and short tapered bristles implanted by tufts (bundles of bristles) in a bristle base and mixed mutually (see Patent Document 3), etc. Furthermore, there proposed are a toothbrush formed by immersing the free end portion of composite synthetic resin filament having a cross-sectional shape with polyamide resin island portions scattered in a polyester resin sea in an acid or alkali solution and dissolving the sea portion to expose the island portions only at the bristle free end so that the islands in a sea composite fibers with the core bristles formed in a specified length are implanted in a bristle base (see Patent Document 4), a toothbrush formed by implanting a brush formed into a shape with a plurality of unit cross-sectional elements which form a predetermined shape such as circle, ellipse, triangle, or hexagon linked for the base cross-sectional shape on a bristle base surface, immersing the brush in an acid or alkali, or other chemical solution, splitting the brush free end portion into a plurality, and forming each of split bristles in a sharp taper (see Patent Document 5), and a toothbrush having a plurality of sharp tapered split bristles formed at the free end portion and at the same time having a brush with other split bristles whose lengths are varied with respect to specific split bristles implanted (see Patent Document 6).

The toothbrushes as described above with tapered bristles of various shapes implanted in a bristle base have excellent suitability for bristle insertion into narrow portions, such as the gaps between neighboring teeth and gaps between the teeth and the gums because of the free end shape of the tapered bristles and is highly effective in removing dental plaque and cleaning the teeth of the relevant portions. However, toothbrushes using conventional tapered bristles as described above have tufts of synthetic resin filaments at least with one end formed in a taper form folded into two in a U-shape and fitted and fixed (driven) together with anchor (also called metal wire rod, wire staple, etc.) into tuft holes formed in a bristle base of a brush main body formed beforehand by injection-molding of synthetic resin. However, in the event that bristle tufts are driven into tuft holes of the bristle base using anchor, there is a restriction in the thickness of the bristle base which is unable to be reduced excessively, and there is a limitation in the density of the bristle tuft to be implanted into one tuft hole.

In the event that bristles processed to have tapered bristles beforehand are implanted into a bristle base, implantation using anchor as described above prevents the free end from being cut to an even length by trimming after implantation, and the bristled surface is held as implanted. However, in the case of implantation using anchor, the bristles are bent in a U-shape at the portion where bristles between the tuft hole bottom surface and anchor are inserted, but as a matter of course, a slight level difference is generated at the bent position, and this level difference causes the bristled surface to be irregular. That is, by the implantation using anchor, it is unable to manufacture a toothbrush which has an bristled surface with the free end aligned using bristles whose free ends are processed in advance. However, because the shape (configuration) of the bristled surface has big effects on cleaning the teeth and removing dental plaque, the shape of the bristled surface is extremely important in toothbrushes.

On the other hand, as a method for fixing bristles to the toothbrush bristle base, in addition to the above-mentioned method of using anchor, there proposed are many manufacturing methods of toothbrushes with bristles fixed to the bristle base without using anchor (anchorless toothbrushes), such as so-called in-mold process to fix bristles to a bristle base by forming a thick portion wider than the hole diameter of tuft holes or tuft diameter at the base portion of tufts, for example, a fused mass formed by fusion-bonding, disposing the thick portion in a molding cavity at the time of molding the brush main body, filling the cavity with molding material of the brush main body, and molding the brush main body (for example, see Patent Documents 7 to 9), and a method for preventing leakage of molding material at the time of molding a brush main body by mounting bristles to a bristled part cover (primary molded handle section) and then molding this bristled part cover integrally with the bristle base (secondary molded handle section) (see Patent Documents 10, 11, etc.), and a so-called fuse-in process in which a plurality of holes (tuft holes) are formed to house bristles (setae) into a bristle base (also called a bristle holder or bristled part), fixed-side base end portion of the bristles is heat-fused without molding the tuft holes, further the bristle length is shortened to form a thick portion (also called a thickened area and enlarged portion) at the fixed end section, and the base end portion of molten bristles is fusion-bonded to the bristle base (see Patent Documents 12, 13, etc.). Furthermore, there is proposed a toothbrush in which a head insert is bonded to a bristle base (head section) of a brush main body after fixing the base end portion (non-needlelike section) of a needlelike bristles by heat-fusing after the base end portion is pressed into a through-hole formed in a bristled part cover (head insert) of needlelike bristles whose free end is sharpened in a taper form (see Patent Document 14, etc.). According to these toothbrush manufacturing methods without using anchor, as compared to the method for driving bristle tufts together with anchor into tuft holes formed in the bristle base, the thickness of the bristle base can be reduced and ease of using the toothbrush in the oral cavity can be expected to be improved. In addition, the bristle implanting density of bristles can be increased as compared with the method using anchor. However, toothbrushes manufactured by the conventional anchorless toothbrush manufacturing methods had the bristled part formed by providing regular free end rounding processing by machining to the free end of bristles planted to the bristle base or mechanically dividing the free end after integrally fixing and planting bristles to the bristle base when the brush main body is molded by the above-mentioned manufacturing methods.

In addition, when bristles with the free ends processed in advance are fixed to the bristle base without using anchor, the free ends of bristles are unable to be mechanically or chemically processed after forming the bristle base to trim the shape of the bristle tuft free end portion or are unable to have the brush surface shapes composed with the free end of bristles. Therefore, the shape of the brush tuft free end and the brush surface shapes must be adjusted at the time of implanting. For example, in the insert process disclosed in Patent Documents 7 to 9, as shown in FIG. 15, a thick portion (fused mass) 31 is formed by fusing bristles 2 of the tuft 3 at the base end portion 30b of the tuft 3 formed by bundling bristles (setae) 2, and a cavity 140 is filled with molding resin material with the thick portion 31 disposed inside the cavity 140 of a brush molding dies 130 and the bristles 2 (tufts 3) are fixed to the bristle base of the brush main body, but when the thick portion 31 is formed at the base end portion of the tuft 3 and is disposed within the cavity 140, the free end 30a side tapered at each tuft 3 is brought in contact with a backplate 110, and the free end shape of the tuft 3 and the shape of the brush surface f composed with bristles 2 must be adjusted in advance. In addition, in the manufacturing method of a anchorless toothbrush by the fuse-in process disclosed in the Patent Document 12, for example, as shown in FIG. 19, the base end 30b side of the tuft (bristle tuft) 30 of bristles 2 is melted to form the thick portion (thickened portion, molten mass) 31, and this is fusion-bonded to the bristle base (bristle supporter) 12 of the brush main body 10 formed in advance. Furthermore, in the manufacturing method of anchorless toothbrushes by the fuse-in process disclosed in the Patent Document 13, as shown in FIG. 20, the base end portion 30b of the bristles tuft (bristles bundle) 30 is fused to form the thick portion (enlarged termination portion) 31 and at the same time, the bristled surface 12a of the bristle base (bristle base) 11 of the brush main body 10 is fused, and furthermore, tuft holes (dented holes) 6 are formed on the bristled surface 12a as shown in FIG. 21, and the fused thick portion 31 is heat-fused to the fused bristled surface 12a or tuft holes 6 formed on the bristled surface 12a to fix the tuft 3 to the bristle base 12. In these processes disclosed in Patent Documents 12 and 13, when the thick portions 31 is formed in the base end portion 30b of the tuft 3 and this is fused to the bristled surface 12a of the bristle base 12, the tapered bristle free end side (free end side) 30a of each tuft 3 is brought in contact with backplates 410 and 510 and the free-end shape of the tuft 3 and the shape of brush surface f composed with bristles must be adjusted in advance.

As described above, when the bristles with the free end processed in advance are implanted to the bristle base and the bristled part is formed without using anchor, post-processing after implantation is unable to be performed, and therefore, at the time of implantation, the free end portion of bristles with the free end processed is brought in contact with the backplate, etc. and under the aligned condition, operations must be performed. However, in the case of bristles formed simply into a tapered shape for increased cleaning efficiency, the free end is slender and is scarcely elastic, the tapered free end portion is brought into contact with the backplate at the time of implantation operation and the free end is aligned, the relevant free end portion is bent or broken, the free end of bristles after implantation tends to be not uniform, and it is difficult to adjust the brush surface composed with the free end portion of tufts and free end to a desired shape.

Patent document 1: Japanese Unexamined Patent Publication No. H6-141923
Patent document 2: Japanese Unexamined Patent Publication No. H7-284412
Patent document 3: Japanese Unexamined Patent Publication No. H11-75939
Patent document 4: Japanese Unexamined Patent Publication No. H9-322821
Patent document 5: Japanese Unexamined Patent Publication No. 2003-144229
Patent document 6: Japanese Unexamined Patent Publication No. 2003-199626
Patent document 7: Examined Patent Publication (Kokoku) No. H6-16725
Patent document 8: Patent Publication No. 2732875
Patent document 9: National Publication of Translated Version No. H9-512724
Patent document 10: Japanese Unexamined Patent Publication No. H9-182632
Patent document 11: Japanese Unexamined Patent Publication No. 2003-102552
Patent document 12: Japanese Unexamined Patent Publication No. H2-99002
Patent document 13: Examined Patent Publication (Kokoku) No. H6-46962
Patent document 14: Japanese Unexamined Patent Publication No. 2004-181215

DISCLOSURE OF THE INVENTION

Problems to be Solved by the Invention

The present invention is to provide a toothbrush which has excellent suitability for bristle insertion into narrow portions, such as the gaps between neighboring teeth and gaps between the teeth and the gums, and is highly effective in removing dental plaque and cleaning the teeth, and at the same time, is highly easy to use in the oral cavity and further has a highly attractive appearance.

Means for Solving the Problems

In order to achieve the above object, the present inventors devoted themselves to examinations and found that a toothbrush with an aligned bristle free end and free of bend or breakage could be manufactured when the tapered bristle free end was fixed to the bristle base by thermally fixing bristles formed into a specific tapered shape in advance without using anchor and forming the bristled part, and completed the present invention.

That is, the toothbrush related to the present invention is a toothbrush that includes a brush main body made of a synthetic resin and has a bristle base and bristles made of a thermoplastic resin which have been fusion-bonded to the bristle base to constitute a bristled part, wherein at least some of the bristles constituting the bristled part (1) contain tapered bristles which are bristles having split free ends, and the split free ends having been tapered beforehand, or (2) comprise tapered bristles which have a sectional shape having a core-sheath structure or islands in a sea structure, or (3) are tapered bristles in each of which a core bristle comprising a core or island portion has been formed beforehand so as to be exposed at the free end.

In the toothbrush related to the present invention as described above, it is preferable that each of the bristles are fixed to the bristle base at a thick portion formed at each of base end portions of the bristles. The thick portion is preferable to be composed with a fused mass formed by heat-fusing the base end portion of each of the bristles or bristle tufts.

The thickness of the bristle base in the toothbrush related to the present invention is preferably not more than 3.5 mm.

For the tapered bristles in the toothbrush related to the present invention, synthetic resin filaments each with a sectional shape composed of a plurality of connected unit cross-sectional elements can be used. In such event, immersing the free end of the synthetic resin filament in solutions such as alkali, acid, etc. can produce tapered bristles with the tapered split bristles formed at the bristle free end in the quantity that conforms to the quantity of the linked unit cross-sectional elements.

As the tapered bristles which have a cross sectional shape having the core-sheath structure or islands in a sea structure, the tapered bristles formed in a tapered shape in which the sheath portion or sea portion becomes thinner towards the free end can be used. In the case of such tapered bristles, the tapered bristles may be split bristles with a plurality of core bristles exposed at the free end or tapered bristles with a single core bristle exposed at the free end. For the tapered bristles whose cross-sectional shape has a core-sheath structure or islands in a sea structure and has a core bristle formed at the free end, it is preferable that the cross-sectional shape of each of the core bristles of the tapered bristles has a nearly same shape throughout the length in the axial direction of the core bristle.

The material of the bristles is not particularly limited and polyester resin, polyamide resin, polyolefin resin, etc. may be used. In particular, in the case of the tapered bristles whose cross-sectional shape has a core-sheath structure or islands in a sea structure and has a core bristle with a core or island portion exposed at the free end, it is preferable that a main component of the material of the core or island is a polyamide resin, and a main component of the material of the sheath or sea portion is a polyester resin.

In a toothbrush related to the present invention, the bristled portion may be formed by at least two or more kinds of bristles of different specifications. That is, all the bristled part may not be formed with tapered bristles as described above but tapered bristles are implanted for only a part of the bristled part and the remaining portion may be regular bristles. For example, the tapered bristles may be implanted to at least part of the front end portion, right-side surface portion, center portion, left-side surface portion, and rear end portion of the bristled part. The tapered bristles may be formed by combining at least two or more kinds of bristles of different specifications of the free end shape, thickness, cross-sectional shape, length, material, etc. Furthermore, when bristles other than tapered bristles are used, bristles of different thicknesses, lengths, cross-sectional shapes, materials, etc. may be combined.

In addition, the brush surface formed at the free end of bristles in the bristled part may not always be flat but may be formed into a desired shape, and the brush surface may have irregularities, and in such event, the brush surface may have irregularities in both directions of the length direction and the width direction of the bristled part.

In the toothbrush related to the present invention as described above, as a method to thermally fix bristles to the bristle base, toothbrushes can be manufactured in any method, including a method to fuse bristles to the bristle base of the brush main body by an in-mold process or fused-in process, etc.

Effect of the Invention

The toothbrush related to the present invention is a so-called anchorless toothbrush in which the bristled part is formed by fusion-bonding synthetic resin bristles and thermally fixing them to the bristle base, for example, by in-mold process or fused-in process. Consequently, as compared to the toothbrushes manufactured by driving (fitting) bristle tufts together with anchor into tuft holes formed in the bristle base of the brush main body, the bristle base is able to be made with the thickness of the bristle base reduced, and the toothbrush is highly easy to be used in the oral cavity and at the same time, has a highly attractive appearance, too. In addition, because at least some of the bristles constituting the bristled part (1) contain tapered bristles which are bristles having split free ends, and the split free ends having been tapered beforehand, (2) comprise tapered bristles which have a sectional shape having a core-sheath structure or islands in a sea structure, or (3) are tapered bristles in each of which a core bristle comprising a core or island portion has been formed beforehand so as to be exposed at the free end, the toothbrush has excellent suitability for bristle insertion into narrow portions, such as the gaps between neighboring teeth and gaps between the teeth and the gums.

That is, the toothbrush with bristles implanted without any anchor and having a thin bristle base enables us to handle the toothbrush head more freely in the oral cavity than the toothbrush with bristles implanted by the use of anchor. Consequently, the toothbrush head can be smoothly moved to places suited for cleaning portions where imperfect cleaning is likely to occur and high risk of dental diseases exists, and in cleaning at the position, a high degree of operating freedom can be secured and effective motion of bristles that removes dental plaque can be achieved. Thus, the plaque removing capabilities can be enhanced. In addition, in the present invention, as bristles which are implanted by anchorless, tapered bristles are used, and this enables the bristles to easily reach the gaps between neighboring teeth and gaps between the teeth and the gums, and other narrow portions subject to high dental disease risk, and the toothbrush can exhibit superb dental plaque removing effects as compared to conventional toothbrushes.

Furthermore, in the case of regular tapered bristles (simple tapered bristles), because of the taper shape formed to be thinner towards the free end, when the tuft density is low, low elasticity results and polishing and cleaning properties in flat portions of teeth are likely to be lowered, but the toothbrush related to the present invention can increase the tuft density as compared to the case in which bristles are driven into tuft holes using anchor because the bristles are thermally fixed to the bristle base. Consequently, even though the tapered bristles are used, the tuft achieves high elasticity and the toothbrush provides excellent polishing and cleaning properties not only in narrow portions such as the between the teeth and the gums or the gaps between neighboring teeth but also in the teeth planar portions, and is highly effective in removing dental plaque for the whole teeth and excels in cleaning power.

In the toothbrush related to the present invention, there is no case in that the free end is bent or the free end is not aligned when bristles are fixed to the bristle base, because the free end is elastic due to a plurality of split bristles at the free end of bristles and the free ends of a plurality of split bristles are brought in contact with the backplate surface in the case of tapered bristles whose free end of the foregoing (1) is split, and because the free end is elastic due to core bristles and the core bristles are brought in contact with the backplate surface in the case of tapered bristles in which the cross-sectional shape of the foregoing (2) has a core-sheath structure or islands in a sea structure and tapered bristles in each of which a core bristle including a core or island portion has been formed beforehand so as to be exposed at the free end, when the brush surfaces composed with the free ends of tufts and bristles are adjusted to achieve a desired shape by bringing the free end of bristles is brought in contact with the backplate in the event that bristles are fixed to the bristle base without using anchor, because for the bristles which compose the bristled part, tapered bristles of specific structures of foregoing (1) to (3) are used. Consequently, it is able to form the tuft free-end shape and the brush surfaces composed by the bristles free-end into optional shapes by forming the portion of the backplate which the free end of the bristles come in contact with into a desired shape.

Furthermore, as is the case of the present invention, when bristles processed to have tapered free end in advance are implanted to the bristle base, in the case of conventional implantation using anchor, the free end is unable to be aligned by trimming after implantation and the bristled surface is kept as implanted, and bristles are folded in a U-shape at the bristles are held between the tuft hole bottom surface and anchor and a slight level difference is generated at the folded position, and this level difference causes the bristled surface to be unaligned, and it is therefore unable to manufacture a toothbrush having the bristled surface with an aligned free end using bristles with the free end processed in advance. On the other hand, the toothbrush according to the present invention, by anchorless implantation, a toothbrush that has the bristled surface with a free end aligned to specific shapes such as protruded, recessed, uneven, and all other surfaces, not to mention a flat surface can be obtained, and a toothbrush with higher cleaning capabilities and higher effects in removing dental plaque can be provided.

In the event that bristles of the toothbrush are fixed to the bristle base by the thick portion formed at the base end portion, an undercut section is formed between the thick portions and the bristled surface and by the anchor effect of the thick portion, the fixing strength of bristles to the bristle base is increased, and the bristles are difficult to drop from the bristle base, which is preferable. Furthermore, in the event that the thick portion is composed with a fused mass formed by heat-fusing the base end portion of bristle tufts, drop of bristles can be definitely prevented by bristles which are heat-fused each other.

By keeping the bristle base thickness of the toothbrush to not more than 3.5 mm, a toothbrush that achieves superb ease of use in the oral cavity and highly attractive appearance can be obtained.

In the event that as the tapered bristles, those with tapered split bristles formed at the bristle free end in the quantity that conforms to a number of unit cross-sectional elements linked are used by using synthetic resin filaments which have a cross-sectional shape with the plurality of unit cross-sectional elements linked and whose free ends are immersed in alkali, acid, or other chemical solutions, the toothbrush has excellent suitability for bristle insertion into narrow portions by a plurality of split bristles formed at the free end and provides superb elasticity of bristles and achieves outstanding dental plaque removing effect, though the bristles come in soft contact with the gums and are free of damaging the gums or free of causing a user to feel pains.

In addition, in the event that the tapered bristles have a cross-sectional shape having a core-sheath structure and islands in a sea structure, or tapered bristles in each of which a core bristle having a core or island part has been formed so as to be exposed at the free end, the toothbrush has excellent suitability for bristle insertion into narrow portions by a plurality of split bristles formed at the free end and provides superb elasticity of bristles and achieves outstanding dental plaque removing effect, though the bristles come in soft contact with the gums and are free of damaging the gums or free of causing a user to feel pains. Furthermore, a toothbrush in which the sheath portion or the sea portion is formed to become thinner towards the bristle free end not only provides soft contact with the gums but also has excellent suitability for bristle insertion into narrow portions.

In the event that polyester resin is used for the material of the bristles, the bristle free end can be easily processed to be tapered or to form split bristles by immersing in alkali chemical solutions such as NaOH, etc. In the event that nylon resin is used for the material of bristles, bristles with outstanding elasticity and durability can be obtained even if they are processed to be tapered. Furthermore, in the case of tapered bristles which have a sectional shape having a core-sheath structure or islands in a sea structure in which the core portion or the island portion is made of nylon resin and the sheath portion or the sea portion is polyester resin, immersing the bristle free end in the chemical solution as described above forms core bristles with the sheath portion and the core portion formed with nylon resin exposed at the bristle free end, and tapered bristles in which the sheath portion or sea portion made of polyester resin grow thinner towards the bristle free end can be easily manufactured and at the same time, a toothbrush with highly elastic bristles and superb durability can be obtained by the nylon resin of the core portion.

In addition, by configuring the bristled part with at least two types of bristles of different specifications such as material, thickness, cross-sectional shape, length, free-end shape, etc., cleaning capabilities, durability, etc. can be freely established in accord with principal objects of toothbrushes manufactured, such as removal of dental plaque, massage of the gums, etc.

In the case of a toothbrush whose brush surface composed with bristle free end in the bristled part is not flat, for example, a toothbrush whose brush surface has irregularities and furthermore, in the case of a toothbrush whose brush surface has irregularities in both length direction and width direction of the bristled part, the bristle insertion into narrow portions such as the gaps between neighboring teeth and gaps between the teeth and the gums can be improved by the protruded portion in the brush surface, and a toothbrush with still greater effect of dental plaque removal and cleaning capabilities can be obtained.

The toothbrush related to the present invention can be easily manufactured by thermally fixing bristles to the bristle base without using anchor by, for example, the in-mold process or fused-in process.

Figure 1:
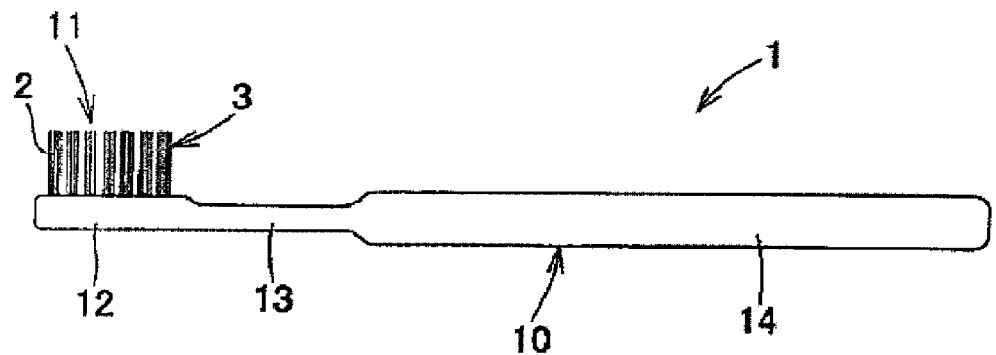
FIG. 1 is a front view showing one embodiment of a toothbrush according to the present invention.

| Description of Reference Numerals | |
| --- | --- |
| 1 | Toothbrush |
| 2 | Bristles |
| 3 | Bristle tuft |
| 4 | Bristled part cover |
| 10 | Brush main body |
| 11 | Bristled part |
| 12 | Bristle base |
| 13 | Neck |
| 14 | Block handle |
| 31 | Thick portion |
| f | Brush surface |

BEST MODE FOR CARRYING OUT THE INVENTION

Figure 2:
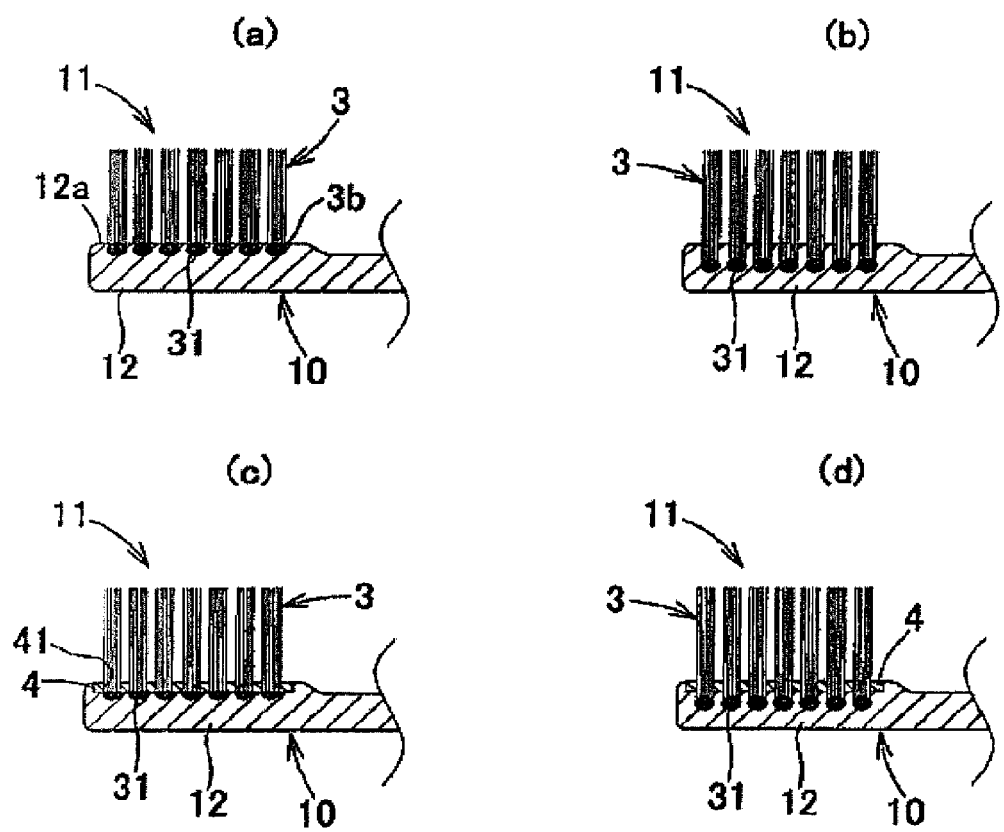
FIGS. 2(a) to (d) are enlarged cross-sectional views of a principal portion (bristled part) of the toothbrush.
Figure 3:
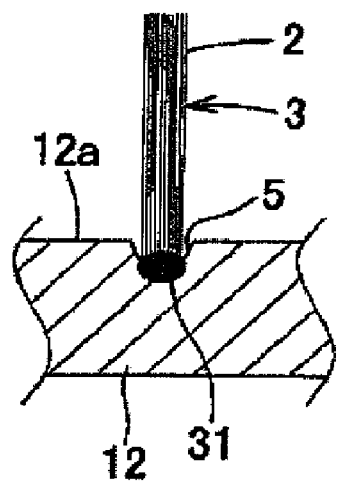
FIGS. 3(a) and (b) are enlarged cross-sectional views of a principal portion (bristled part) of a toothbrush of another embodiment.
Figure 3:
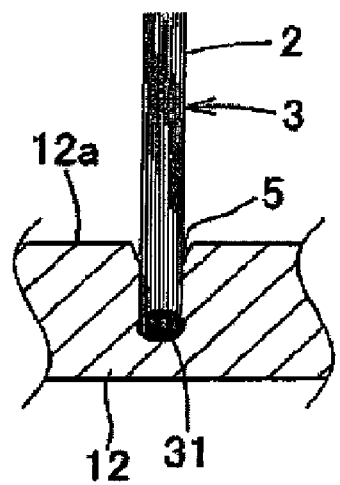

FIG. 1 is a front view showing one embodiment of a toothbrush related to the present invention. A toothbrush 1 is equipped with a brush main body 10 made of synthetic rein, a bristled part 11 installed to a bristle base 12 of the main body 10. The brush main body 10 includes, for example, the bristle base 12, a neck 13, and a block handle 14, which are integrally formed by injection molding of synthetic resin such as polypropylene. This toothbrush 1 is a so-called anchorless toothbrush, in which the bristled part 11 mounted to the bristle base 12 is formed by thermally fixing tufts 3 formed by bundling a plurality of bristles 2 whose free end is taper-processed in advance to the bristle base 12 of the brush main body 10 without using any anchor. Specifically, for example, as shown in FIG. 2(a), thick-wall sections 31 composed with a fused mass in which a plurality of bristles 2 that compose tufts 3 are fused each other are formed at the base end portion 3b embedded in the bristle base 12 in the tufts 3, the thick portions 31 are heat-fused each other to synthetic resin that composes the bristle base 12 and at the same time, by anchor effects by the thick portions 31 formed into a large diameter by the diameter of tufts 3, tufts are firmly fixed to the bristle base 12. The thick portions 31 may be embedded right below a surface (bristled surface) 12a of the bristle base 12 as shown in FIG. 2(a) but the thick portions 31 may be embedded inside the bristle base 12 as shown in FIG. 2(b). In addition, as shown in FIG. 2(c), on the surface side (bristled surface side) of the bristle base 12, the thick portions may be formed by integrally fixing a bristled part cover 4 formed a plurality of tuft holes 41 . . . that conform to the size (tuft diameter) and position of the tufts 3 implanted in the bristle base 12. Furthermore, in such event, the thick portions 31 formed at the base end portion of the tufts 3 may be installed in contact with the bottom surface of the bristled part cover 4 as shown in FIG. 2(c) or the thick portions 31 may be embedded inside the bristle base 12 located lower than the bristled part cover 4 as shown in FIG. 2(d). Furthermore, as shown in FIGS. 3(a) and 3(b), an annular groove 5 may be formed on the surface 12a of the bristle base 12 around the tufts 3. This groove 5 prevents molding material of the brush main body 10 from running off from the bristled surface 12a around the tufts 3 when manufacturing the toothbrush 1 by an in-mold process described later.

The toothbrush 1 related to the present invention is able to reduce the thickness of the bristle base 12 by shallowing the embedding depth of bristles in the bristle base 12 because the toothbrush 1 is formed by thermally fixing bristles to the bristle base 12 of the brush main body 10 without using anchor. Excessively small thickness of the bristle base 12 poses problems from the aspect of the strength; for example, at 2.0 mm or less, the strength becomes insufficient but there is no limitation other than that, and the thickness is preferably less than 5.0 mm, and more suitably 4.0 mm or less, and still more preferably, 3.75 mm or less. By achieving this kind of thickness, a toothbrush which provides increased ease of use in the oral cavity as well as which is preferable from the viewpoint of attractive appearance can be manufactured. There is no limitation to the plane shape of the bristle base 12 and others.

As a method to fuse the base end portion 3b of tufts 3 to form the thick portions 31, a method by heating, method by ultrasonic vibrations, method by solvent, etc. may be mentioned, but since the tufts 3 are formed by bristles made of thermoplastic resin filaments, the method by heating is preferable because it is easy and reliable. Examples of fusing method by heating include a method by flame, a method of spraying heated gas, for example, inert gas, a method for bringing a heated plate in pressure-contact, etc.

FIG. 4(a) shows one embodiment of bristles 2 used for a toothbrush related to the present invention and is an example of tapered bristles that have split free ends (split bristle 21) which have been tapered beforehand. The bristles (tapered bristles) 2 which have split bristles 21 at the free end have cross-sectional shapes with a plurality of unit cross-sectional elements 22 of various kinds of shapes such as circle, ellipse, triangle, hexagon, etc. as shown in FIGS. 4(b) to 4(h). In addition, the cross-sectional shape may be a multi-lobe type cross-section with single or a plurality of lobe portions with cross sectional areas different from that of a specific robe portion connected to the circumference of the lobe portion via a bond portion with a wall thickness thinner than the minimum cross-sectional size of a lobe portion with a minimum cross sectional area. In such event, the number of lobe portions may be preferably 2 to 5 pieces from the practical viewpoint, but the present invention shall not be limited to the quantity of lobe portions but the quantity of lobe portions shall be determined in accord with the intended use. By immersing the synthetic resin filament F in a caustic soda (NaOH) or other chemical solutions and pulling it out, a plurality of tapered split bristles 21 are formed at the free end as shown in FIG. 4(a). In such event, the shape and the length of the split bristle 21 can be optionally adjusted by the concentration of the chemical solutions, immersing time, pulling out speed from the chemical solutions, etc. As a material of synthetic resin filament F which composes bristles 2, nylon, aramid, and other polyamide resins, polybutylene terephthalate (PBT), polypropylene terephthalate (polytrimethylene terephthalate, PPT or PTT), or polyethylene terephthalate (PET), and other polyester resins, polypropylene (PP), polyethylene (PE) and other polyolefin resins, and other publicly known synthetic resins can be used for bristles of a toothbrush.

The bristles 2 with the tapered split bristle 21 formed have the length from the split point to the free end to be ½ or less, preferably ⅓ or less, of the brush height (that is, bristle length) in the implanted state. In addition, the cross-sectional area on the base end side from the split point, that is, a portion (bristle base) to which no melting treatment is provided varies in accord with the cross-sectional shapes, etc., but should be generally between 0.001 and 0.5 mm$^2$, and more suitably between 0.01 and 0.2 mm$^2$. In the event that the cross sectional area of the bristle base is less than 0.001 mm$^2$, weak bristle elasticity results and the bristle lacks necessary rigidity for polishing and cleaning teeth, and in the event that the cross sectional area of the bristle base exceeds 0.5 mm$^2$, the thick bristle results and inferior insertion into narrow portions occur. Consequently, with related elements such as cross-sectional shape, material, etc. taken into account, the cross sectional area shall be appropriately decided with this lower limit and the upper limit used as a reference. In the case of bristles with two kinds of split bristles of different lengths, it is preferable that the length of shorter split bristle is within a range of 1/10 to ⅔ of the length of the longer split bristle. In the event that the length of shorter split bristle is shorter than 1/10 of the length of longer split bristle, polishing and cleaning effects by shorter split bristles are small while in the event that it is longer than ⅔, the effects of having nonuniform lengths of split bristles are unable to be thoroughly exhibited.

Furthermore, FIGS. 5(a) and 5(b) show another embodiment of tapered bristles 2 with split free ends, but the bristles 2 is composed with synthetic resin filaments F which have a cross-sectional shape having a core-sheath structure or islands in a sea structure, and have, in the illustrated example, three core bristles 24 protrudably formed from a sheath portion 23. The bristles 2 with split free ends with the plurality of core bristles 24 protruded from the free ends of the sheath portion 23 composing the outer surface of bristles 2 can be manufactured as shown in FIGS. 5(a) and 5(b) by immersing the composite synthetic resin monofilament F (hereinafter called the composite monofilament) having a core portion 26 composed with material with, for example, nylon, aramid, and other polyamide resins used as main components and having the sheath portion composed with material with, for example, polybutylene terephthalate and other polyester resins used as main components, that is, for example as shown in FIGS. 5(c) to 5(e), the composite filament F having a islands in a sea structure with the polyester resins used for a sea portion 25 and the nylon resins used for an island portion 26, in a chemical solution such as caustic soda (NaOH) and pulling them out to dissolve and remove the sea portion 25 from the free end and thereby exposing the island portion 26. In such event, it is possible to suitably adjust the taper shape at the sheath portion 23 free end or exposed length of the core bristles 24 by adjusting the concentration of chemical solution, immersing time, pulling out speed from the chemical solution, etc. Furthermore, as shown in FIG. 6(b), by immersing the synthetic resin filament F having a cross-sectional shape with a plurality of unit cross-sectional elements 22 connected and having each unit cross sectional element 22 that has a core-sheath structure or islands in a sea structure in a chemical solution such as caustic soda (NaOH), etc. and pulling them out, bristles 2 with core bristles 24 protrudably formed from each free end of a plurality of tapered split bristles 21 as shown in FIG. 6(a) can be obtained, too.

The size of bristles with a plurality of core bristles 24 protrudably formed from the free end of the sheath portion 23 is preferably between 0.150 and 0.300 mm for the diameter on the base end side (core-sheath composite portion), between 0.03 and 0.07 mm for the diameter of a core bristle 24, between 0.2 and 4.0 mm for the core bristle exposed length, and furthermore, between 0.5 and 4.0 mm for the core bristle exposed length. In addition, the length from the bristle base portion to the free end is preferably between 7 and 11 mm. Furthermore, when the diameter of the base end portion is assumed to be 100%, with the boundary between the exposed core bristle 24 and the composite portion set as a base point, it is preferable that taper-processing is provided to the end portion of the composite portion so that the diameter is 70±15% at the location 1 mm closer to the composite portion side from this base point, 89±8% at the location 3 mm closer, and 93±7% at the location 5 mm closer. When the diameter of the composite portion is between 0.150 and 0.300 mm, the diameter of the core bristle 24 is between 0.03 and 0.07 mm, and the exposed length of core bristle 24 is between 0.2 and 4.0 mm, then, the suitability for bristle insertion into subtle points inside the oral cavity, attainment level to the depth in the subtle points inside the oral cavity, and dental plaque removal action by reached core bristles 24 become still more preferable, and furthermore, in the event that the exposed length of the core bristle 24 is between 0.5 and 4.0 mm, the suitability for bristle insertion into subtle points inside the oral cavity, attainment level to the depth in the subtle points inside the oral cavity, and dental plaque removal action by reached core bristles 24 become all the more preferable. When the length from the bristled base portion of the implanted islands in a sea type composite fiber to the free end is within the range from 7 to 11 mm, satisfactory elasticity in obtaining cleaning effects can be obtained and at the same time, excellent suitability for bristle insertion into the gaps between neighboring teeth can be obtained, and excellent ease of use can be achieved, too.

Figure 7:
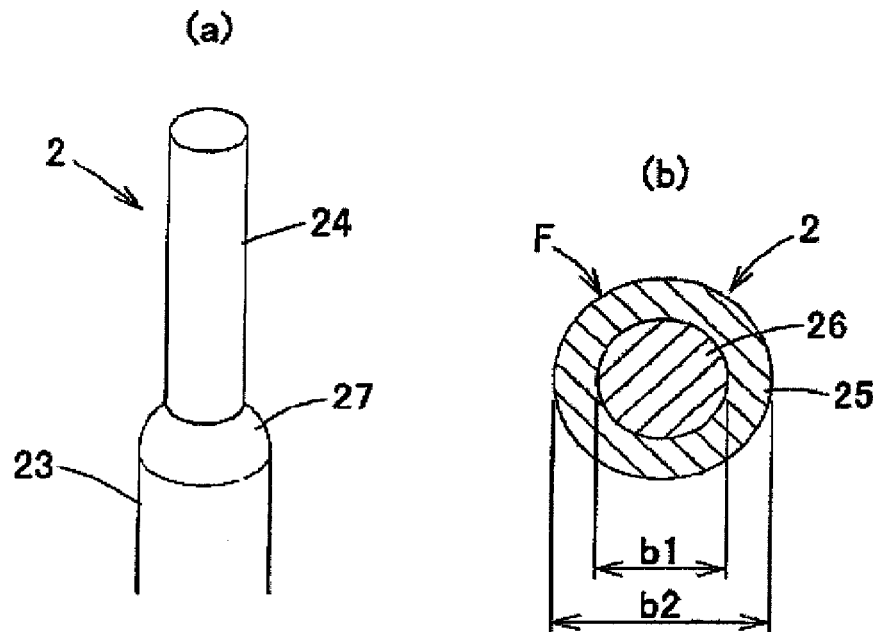
FIG. 7(a) is a perspective view of bristles with a single core bristle protrudably formed at the free end and FIG. 7(b) is the cross-sectional view.

FIG. 7 shows another embodiment of bristles used for the present invention, which is an example of tapered bristle that has a cross-sectional shape having a core-sheath structure or islands in a sea structure, and is preferably formed in a taper in which a sheath portion or sea portion composed with material preferably with polyester resin as a main component becomes thinner towards the free end, and single core bristle 24 composed with material preferably with polyamide resin as a main component exposed at the free end. Specifically, as shown in FIG. 7(b), on the free end side of the composite monofilament F which has a cross sectional shape of core-sheath structure with the sheath portion (sea portion) 25 disposed around one core portion (island portion) 26, the core portion 26 is exposed and the core bristle 24 is protruded at the free end as shown in FIG. 7(a). In the case of composite monofilament F of the core-sheath structure, of the cross sectional area, that is, the cross-sectional area of the whole composite monofilament F containing the core portion 26 and the sheath portion 25, the cross sectional area of the core portion 26 is preferably between 15 and 80% and more suitably between 40 and 80%. By this, in the thermal-fixing operation to the bristle base 12, it is possible to prevent the free end from being bent or becoming nonuniform, while suitable elasticity is being maintained on the bristle base end side, and superb subtle portion cleaning capabilities are being exhibited without damaging the gums by the core bristle 24 with 15-80% cross-sectional area exposed on the free end side.

Figure 5:
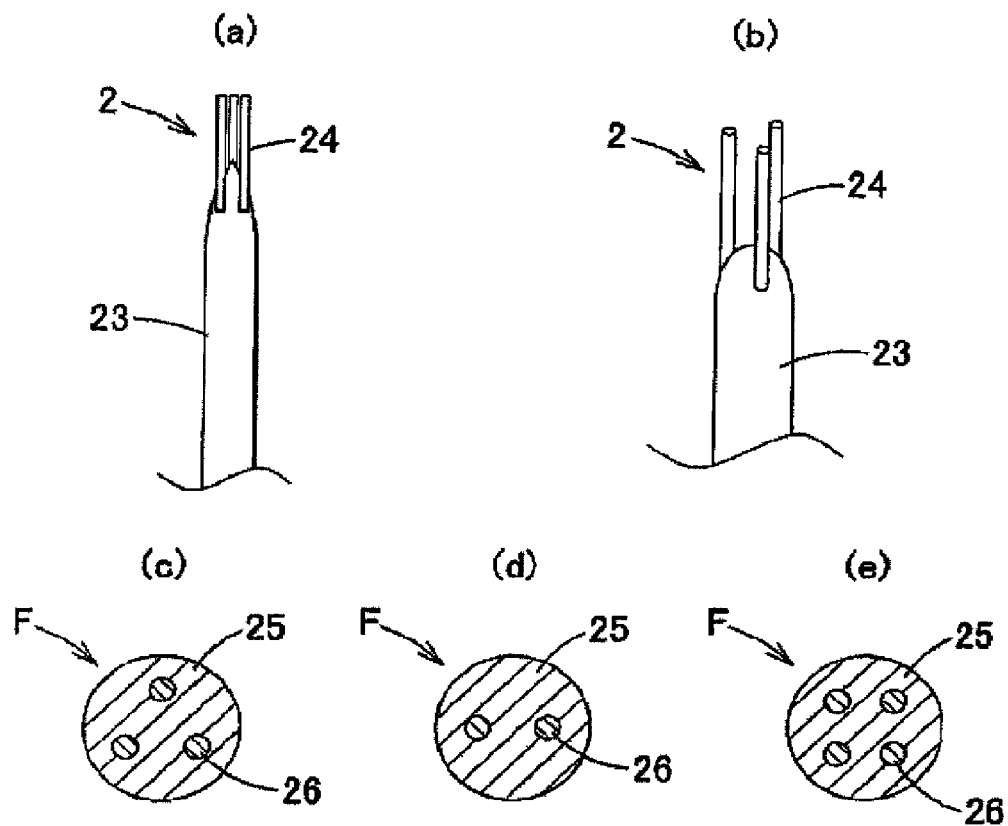
FIG. 5(a) is a front view of bristles with a plurality of core bristles protrudably formed at the free end.
FIG. 5(b) is the perspective view.
FIGS. 5(c) to 5(e) are cross-sectional views of filament which has a islands in a sea structure.
Figure 6:
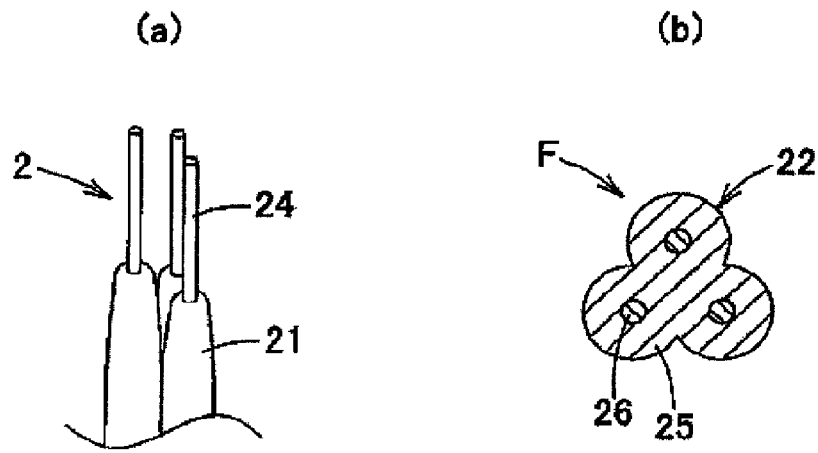
FIG. 6(a) is a perspective view of another embodiment of bristles with a plurality of core bristles protrudably formed at the free end and FIG. 6(b) is a cross-sectional view of filaments of the bristles.

The method for exposing a core portion is the same as that to expose a plurality of core portions shown in FIGS. 5 and 6, but in the event that a single core portion 26 is exposed, a means for removing a sheath portion by a mechanical method is adopted in addition to the chemical method. In the case of a method of chemical removal, for example, the free end side of a composite monofilament F in which polyamide resin is adopted for the core portion 26 and polyester resin adopted for the sheath portion 25 is immersed in an alkaline chemical solution, etc. to expose the core portion 26 and bristles 2 with the core bristle 24 protruded at the free end can be configured.

At the free-end side edge of the sheath portion 23 (25) dissolved as above, a taper portion 27 that continues to the core bristle 24 is inevitably formed, but the taper angle, etc. can be easily adjusted by controlling the immersing time, etc. Forming the taper portion 27 can improve suitability for bristle insertion into and accessibility to narrow portions of the oral cavity.

The cross sectional shapes of the composite monofilament F and its core portion 26 shown in FIG. 7(b) are nearly circular, respectively, and the outside diameter b2 of the composite monofilament F is set to 0.16 mm to 0.25 mm, and the outside diameter b1 of the core portion 26 is set to 40-90% of the outside diameter of the composite monofilament F, and more preferably to 60-80%. The bristle length from the bristled base portion to the free end of implanted bristles 2 is preferably between 6 and 12 mm. Excessively long bristles degrade the brush operability in the mouth and at the same time, bristle elasticity is lost and satisfactory cleaning effects are unable to be obtained. On the other hand, excessively short bristles decreases bristle flexibility during brushing and poor use sensation results and at the same time, the suitability for bristle insertion into the gaps between neighboring teeth is degraded. In addition, the exposure length of the core bristle 24 is set to 5-50% of the bristle length and more suitably to 10-50%, and specifically to a suitable range between 0.5 and 4.0 mm. In the event that the exposure length of the core bristle 24 is less than 5% of the bristle length, the toothbrush is inadequate to allow bristles to reach the gaps between neighboring teeth, tooth necks, pits and fissures and the like. Furthermore, the longer bristles 24 with the core portion 26 exposed, the higher are the cleaning effects on the narrow and deep portions, while the durability lowers. The length of bristles 24 that can maintain practical durability is 50% or less of the bristle length, and specifically, about 4.0 mm or less.

The free-end shape of exposed bristles 24 is optional, and can be processed into a suitable shape such as semisphere, etc. In the present embodiment, polyamide resin is used for the material of the core portion 26 and the core bristles 24 exposed from the sheath portion 23 are stretched straight cylindrically. By this, it is possible to prevent the free end from being bent during the thermal fixing operation to the bristle base 12.

Figure 8:
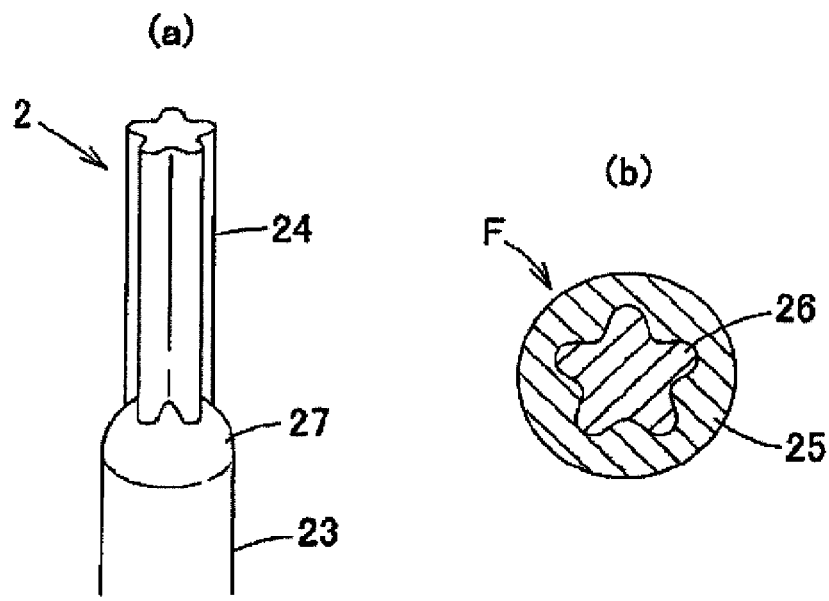
FIG. 8(a) is a perspective view of bristles with a single core bristle protrudably formed at the free end and FIG. 8(b) is the cross-sectional view.
Figure 9:
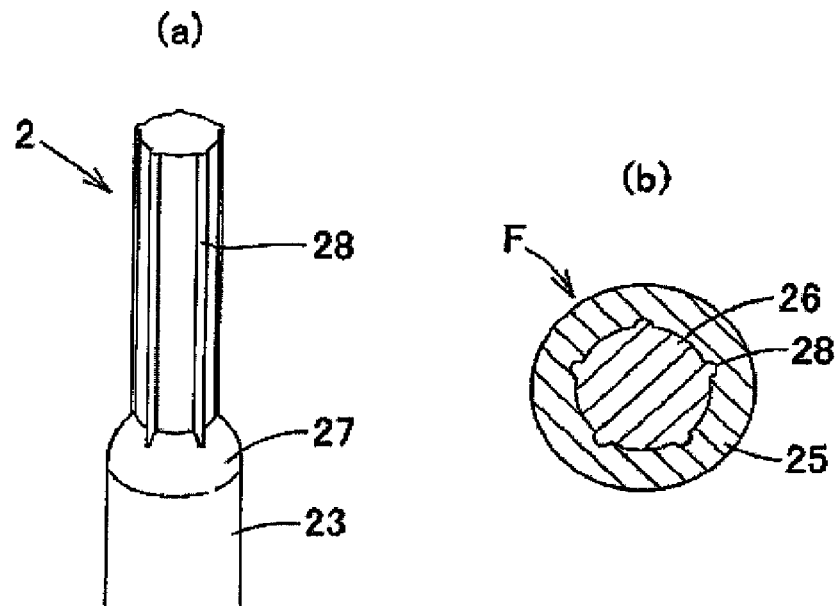
FIG. 9(a) is a perspective view of bristles with a single core bristle protrudably formed at the free end and FIG. 9(b) is the cross-sectional view.
Figure 10:
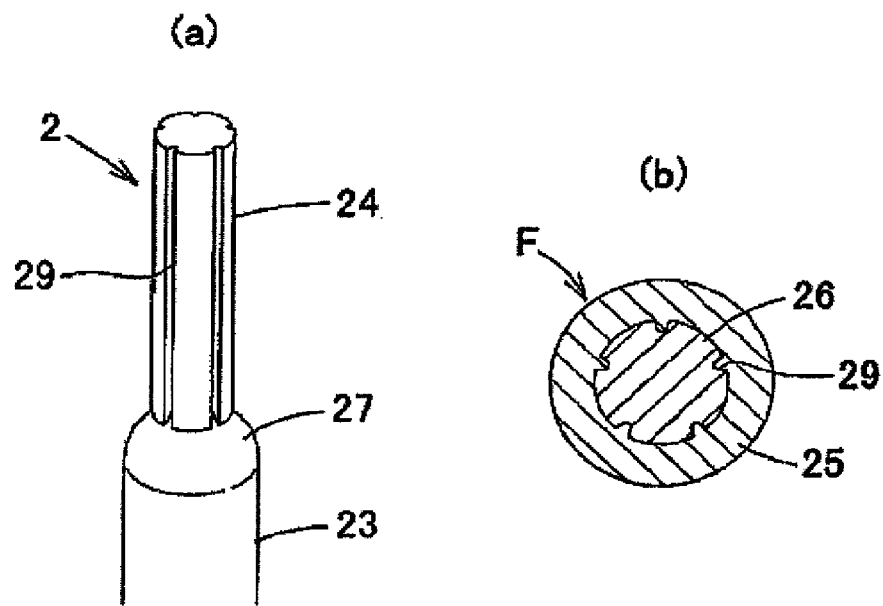
FIG. 10(a) is a perspective view of bristles with a single core bristle protrudably formed at the free end and FIG. 10(b) is the cross-sectional view.

FIG. 8 shows an example with a cross-sectional shape of a core portion 26 as well as a core bristle 24 in which the core portion 26 is exposed from a sheath portion 25 is nearly polygonal, FIG. 9 shows an example with a plurality of protruded row portions 28 extending in the axial direction on the outer circumferential surface of the core portion 26, and FIG. 10 shows an example with a plurality of recessed grooves 29 extending in the axial direction on the outer circumferential surface of the core portion 26 and the core bristle 24.

As shown in FIG. 8, if the cross-sectional shape of the core portion 26 is an approximate polygon with acute angle sections, forming a cut-in portion in such a manner that the sheath portion end portion remains as if it cuts into a recessed portion formed in the core portion 26 can prevent the sheath portion from peeling off from the core-portion exposed base end by the use and can increase the durability in the core portion exposed base end. In the case of FIG. 9 and FIG. 10, as is the case of the approximate polygon as described above, a cut-in portion is formed in such a manner that the sheath portion 23 end portion cuts into a protruded portion 28 or a recessed groove 29 and by the cut-in portion, peeling of the sheath portion 25 end portion can be prevented.

Figure 11:
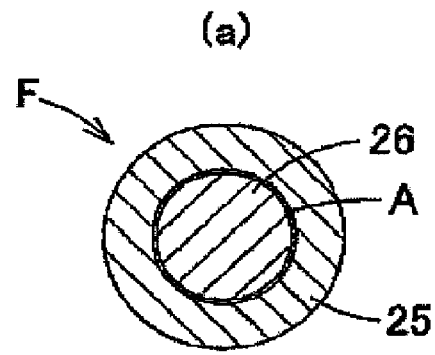
FIGS. 11(a) to 11(c) are cross-sectional views of a filament which has a sectional shape having a core-sheath structure.
Figure 11:
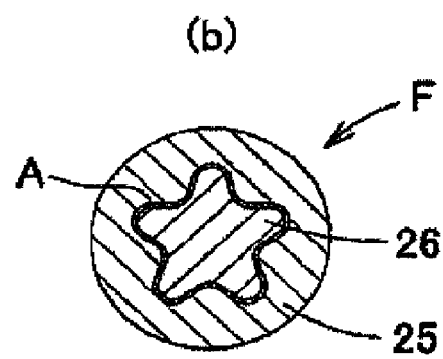
Figure 11:
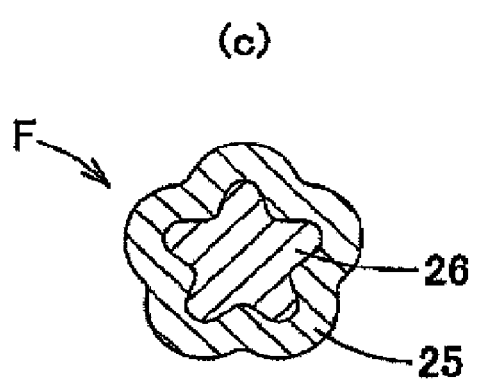

FIGS. 11(a) and 11(b) respectively show a composite monofilament F with an adhesive layer A interposed between the core portion 26 and the sheath portion 25 for bonding the two portions 25, 26 and with this, peeling of the above-mentioned sheath portion end portion can be definitely prevented. In addition, FIG. 11(c) shows the composite monofilament F cross-sectional shape made nearly analogous to the cross-sectional shape of the core portion 26, and by this, the thickness of the sheath portion 25 becomes nearly uniform along the circumferential direction and the sheath portion 25 is difficult to be peeled off from the core portion 26.

In bristles with core bristle 24 exposed at the free end as shown in FIGS. 5 to 11, making the cross sectional shape of the core bristle 24 nearly same throughout the full length in the axial direction can achieve the bristles with elasticity at the free ends and with excellent cleaning capabilities of narrow portions such as tooth necks and the gaps between neighboring teeth. The bristles with the core bristles 24 exposed at the free ends having a nearly same shape throughout the full length in the axial direction can be obtained by using a filament having a core-sheath structure or islands in a sea structure with the core portion or the island portion composed with the material consisting primarily of polyamide resin with high chemical resistance such as nylon, aramid, and with the sheath portion or the sea portion composed with the material consisting primarily of polyester resin such as polybutylene terephthalate, polyethylene terephthalate, polytrimethylene terephthalate, etc, immersing in a chemical solution such as alkali, etc., and removing the material of the sheath portion or the sea portion at the free end portion by melting.

Figure 12:
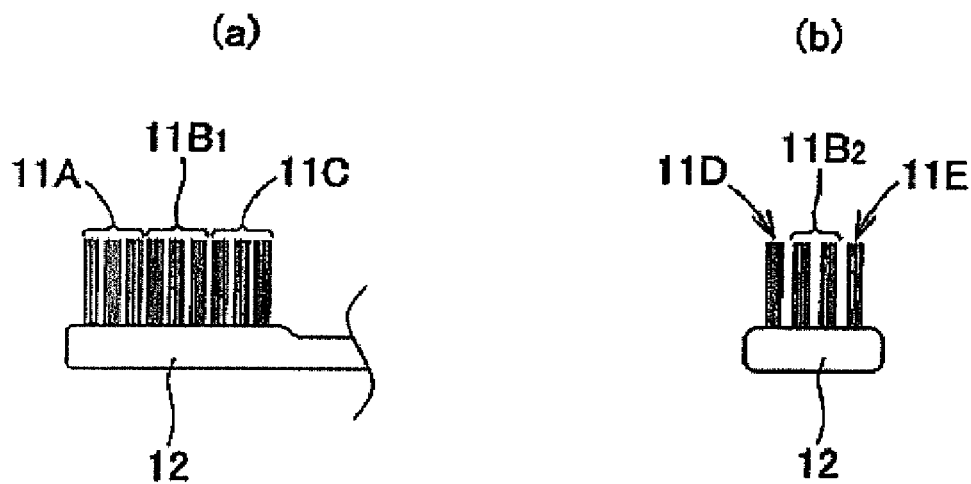
FIG. 12(a) is a front view of a bristled part and FIG. 12(b) a side view to explain the distribution of bristles.

By the way, all the bristles 2 which compose the bristled part 11 may not always be tapered bristles but part only, for example, the free end portion of the bristle base 12 only is made into tapered bristles and the rest may be made into regular round-ended bristles. For example, as shown in FIGS. 12(*a*) and 12(*b*), the above-mentioned tapered bristles may be implanted to at least part of a free end portion 11A of the bristled part 11, center portions 11B$_1$ and 11B$_2$, a rear end portion 11C, a right-side surface portion 11D, and a left-side surface portion 11E. In addition, as the tapered bristles, the free-end shape may be varied in accord with each portion of the bristled portion 11 by using various kinds of free-end shapes shown in FIGS. 4 to 11, and at least two kinds of different specifications such as thickness, cross-sectional shape, length, material, etc. may be used in combination. Furthermore, in the event that bristles 2 other than tapered bristles are included, those with different cross-sectional shapes and materials may be combined. In addition, the arrangement of bristles 2 (tufts 3) of the bristle base 12 is not particularly limited and various arrangement forms can be adopted.

Figure 13:
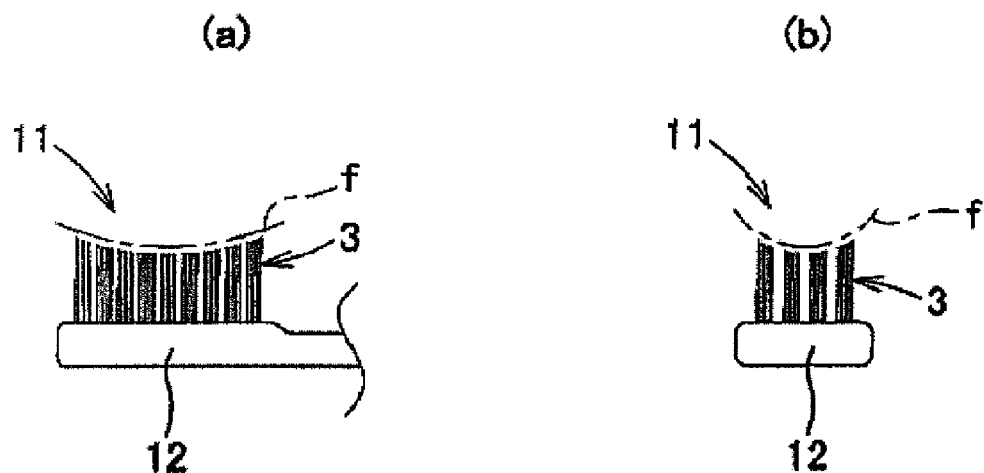
FIG. 13(a) is a front view of a bristled part and FIG. 13(b) a side view to show one embodiment of a brush surface.
Figure 14:
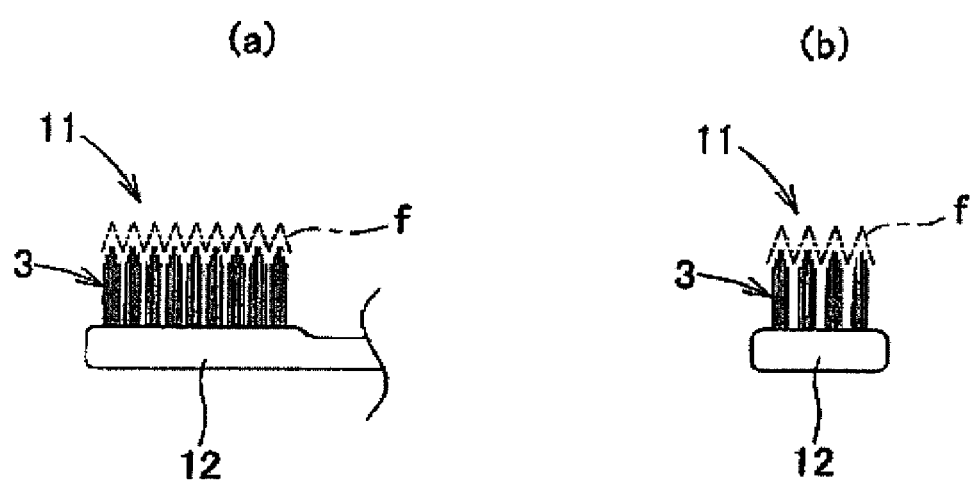
FIG. 14(a) is a front view of a bristled part and FIG. 14(b) a side view to show another embodiment of a brush surface.

Because as described above, the toothbrush related to the present invention is manufactured by a anchorless technique, the bristle base is thin and excellent operability in the oral cavity is achieved, accessibility of bristles to the risky portions of contracting dental diseases and motion for removing dental plaque at the relevant portions are enhanced, and the bristles 2 are tapered bristles such as core-sheath bristles with tapered split bristles 21 or core bristles 24 formed at the free ends, bristles 2 is easy to be inserted into narrow portions such as the gaps between neighboring teeth and gaps between the teeth and the gums and the thickness of the bristle base can be reduced by using no anchor, and at the same time, the toothbrush related to the present invention is not only highly effective in removing dental plaque and cleaning the teeth but also the free-ends of bristles 2 that compose the tufts 3 are not bent or the free ends are free from misalignment at the time of fixing the tufts 3 to the bristle base 12 by bringing a plurality of split bristles 21 and core bristles 24 at the free ends in contact with the backplate surface when the brush surface composed with free ends of tufts and bristles is aligned to have a desired shape by bringing the free ends of bristles into contact with the backplate, etc. when bristles 2 are secured to the bristle base by the in-mold process or fused-in process without using anchor. Consequently, it is possible to form the free-end shapes of tufts or the brush surface configured by bristles free ends into optional shapes by making the portion of the backplate with which the free-ends of bristles 2 come in contact into desired shapes. For example, as shown in FIGS. 13(*a*) and 13(*b*), it is possible to form the brush surface f into a curved shape where the center portion of the bristled part 11 is low (short bristle length) and the bristled part 11 increases the height (long bristle length) as it goes towards the circumferential section. As shown in FIG. 14(*a*), in each of the tufts 3, the length of bristles located at the center portion is made longer and the length of bristles is made shorter as it moves toward the circumference of the tufts 3, and thereby the brush surface f composed with the free ends of bristles 2 have irregularities along the length direction (axial direction of the toothbrush) of the bristled part 11, and furthermore, as shown in FIG. 14(*b*), the brush surface f also has irregularities in the width direction of the bristled part (direction orthogonal to the axis of a toothbrush), so that the brush surface f may have a three-dimensional shape. Forming irregularities in the brush surface f in this way can further improve the suitability for bristle insertion into narrow portions, such as the gaps between neighboring teeth and gaps between the teeth and the gums, and a toothbrush with still greater dental plaque removing effects and outstanding teeth cleaning capabilities can be obtained.

Next description will be made on methods for manufacturing toothbrushes related to the present invention. For the toothbrushes related to the present invention, any publicly known methods that can thermally bond bristles 2 to a bristle base 12 of a brush main body 10 are adopted without using anchor. However, since tapered bristles with split bristles 21 or core bristles 24 formed in the free ends beforehand are used as bristles 2 in the present invention, the free ends of bristles 2 are unable to be processed or cut after the bristles 2 are bonded to the bristle base 12. Consequently, it is necessary to bring the free ends of the bristles 2 in contact with a backplate, etc. and adjust the free ends in advance at the time of bonding bristles to the bristle base 12 so that the desired brush surface f can be obtained.

Figure 15:
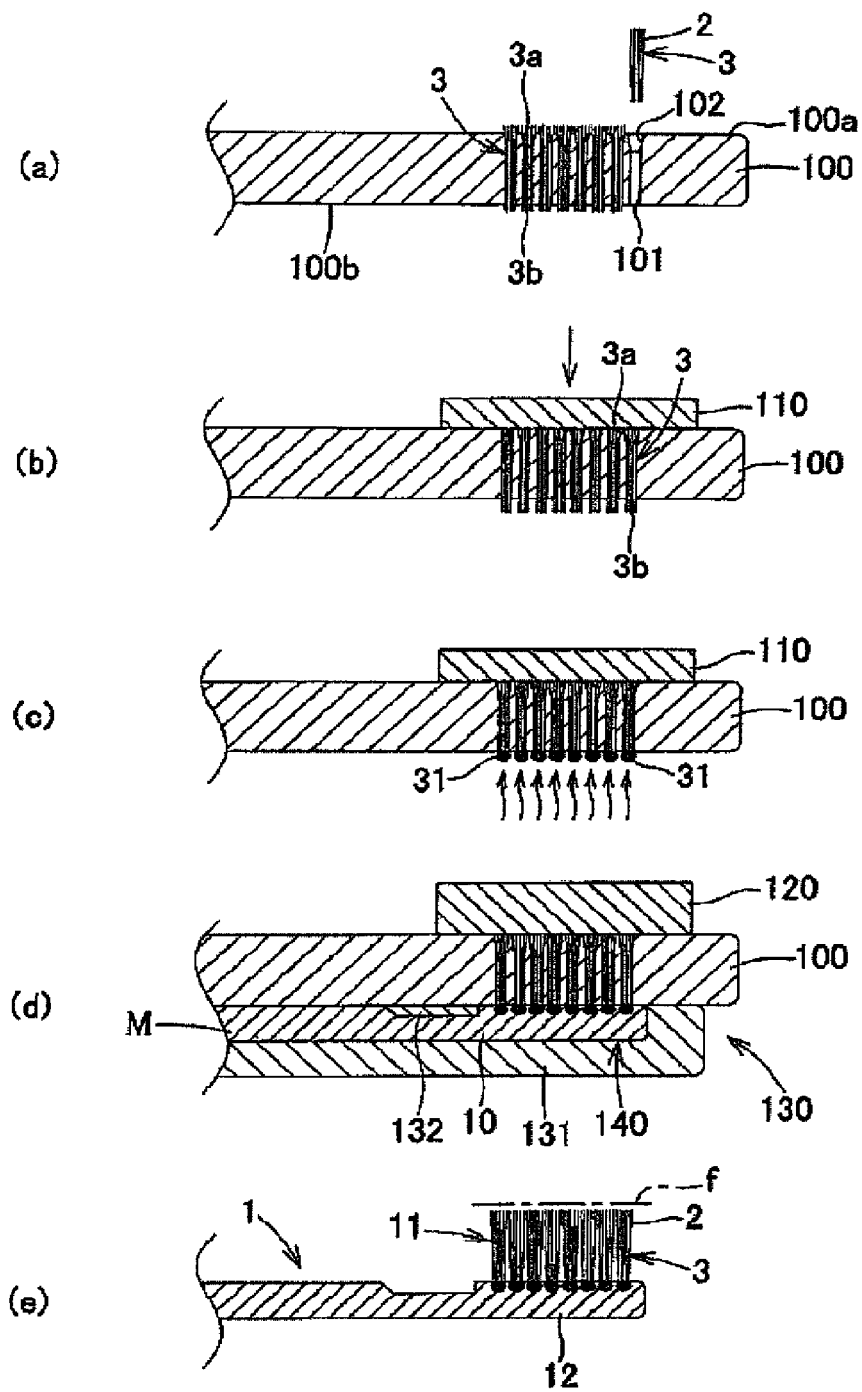
FIGS. 15(a) to 15(e) are illustrations of a toothbrush manufacturing process by an insert process.

First of all, FIG. 15 shows an example of a method of bonding (implanting) bristles 2 to a bristle base 12 of a toothbrush 1 by the insert process disclosed, for example, in Examined Patent Publication (Kokoku) No. H6-16725 (Patent document 7). In the bristles 2 implanting method by this insert process, as shown in FIG. 15(*a*), tufts 3 which bundle bristles cut into a predetermined length in advance and having the free ends tapered are inserted into tuft holes 101 pattern-arranged and formed in a first mold member 100 from the base end side of the bristles by an implanting machine not illustrated. The tuft holes 101 have expanded opening portions 102 disposed in the vicinity of a front surface 100*a* of the first mold member 100 to easily insert the tufts 3. The thickness of the first mold member 100 is set to be nearly equal to the length required for bristles 2 of a completed toothbrush. The tufts 3 are inserted in the tuft holes 101 so that they are protruded about 3 to 5 mm from a rear surface 100*b* of the first mold member 100. Then, as shown in FIG. 15(*b*), a backplate 110 is pressed against the exposed portion of tufts 3 on the front surface 100*a* side and is further brought in contact with the front surface 100*a* to align free end portions 3*a* of each tuft 3 tapered in advance, and after positioning the tufts 3 by the backplate 110, heat is applied to base end portions 3*b* of the tufts 3 protruded from the rear surface 100*b* of the first mold member 100 to melt the tufts 3, and thick portions 31 are shaped. The above-mentioned heating method shall not be particularly limited but a method for spraying heated air or nitrogen, method for melting free of contact by the use of radiation heat, etc., method for melting with burner flames using gas such as natural gas, propane gas, or oxyacetylene, etc., method for bringing a heated plate in contact, and other various methods can be adopted. After forming the thick portions 31 by fusion-bonding the base end portion 3*b* of the tufts 3, the backplate 110 is pulled away, and a clamp plate 120 and a second mold member (brush forming mold) 130 are pressed against both sides of the first mold member 100 as shown in FIG. 15(d). A mold is composed with a part of the first mold member 100 that houses the tufts 3 and forms one side of a mold cavity 140 and the second mold member 130 that forms the other side of the cavity 140. The second mold member (brush forming mold 130) has a separable cavity plate 131 and a core 132. In the cavity 140 formed as mentioned above, a molding material M of the brush main body is injected from a not-illustrated filling hole to fill the cavity, and the brush main body 10 is molded. After molding, the cavity plate 131 and the core 132 are separated from the first mold member 110 to open the mold. By this, the toothbrush 1 with brush surface f formed to be evenly lined at the free ends of the bristles 2 (tufts 3) shown in FIG. 15(e) can be obtained.

Figure 16:
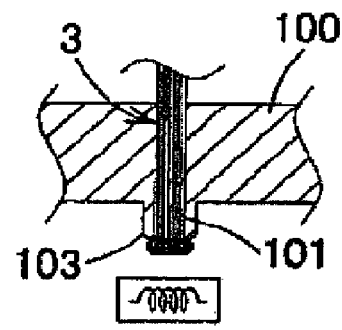
FIGS. 16(a) to 16(c) are illustrations showing an embodiment by another insert process.
Figure 16:
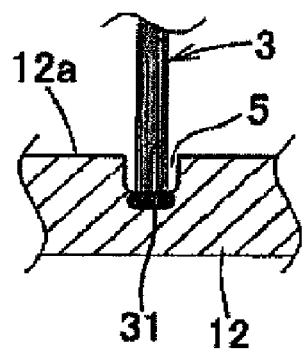
Figure 16:
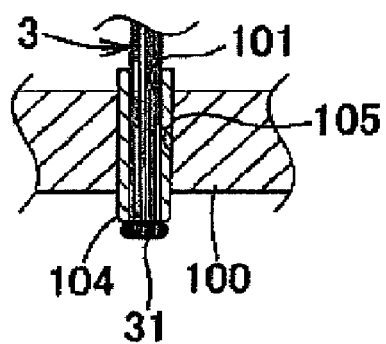

FIG. 16 shows a toothbrush manufacturing method by the insert process same as above, but this is a method stipulated in Patent Publication No. 2732875 (Patent document 8). This method is basically same as that of FIG. 15, but the tuft holes 101 of the first mold member 100 which houses tufts 3 are extended in molding cavity 140 by a sleeve 103. Tufts 3 are introduced in tuft holes 101 of the first mold member 110 until the base end portion passes an opening of the sleeve 103 and runs into the molding cavity 140, and the base end portion of tufts 3 is heated to fusion-bond and thick portions 31 is formed. The thick portions 31 formed in this way seals the opening of the sleeve 103 of the tuft holes 101 by pulling, for example, the tufts 3. In such event, an undercut or a recessed portion is formed between the back side of the thick portions 31 and the opening edge of the sleeve 103, and then in this recessed portion, material is injected to a closed injection molding mold. By this, the thick portion 31 is embedded in a bristle base 12 with a spacing left therebetween from the bristled surface 12a of the brush main body 10 formed inside the cavity 140. The sleeve 103 of the first mold member 100 forms a cylindrical groove 5 between the bristle base 12 and tufts 3 after demolding the mold. This groove 5 can be completely or sufficiently closed before the molding material solidifies by early demolding of a slidable sleeve 104 shown in FIG. 16(c). In such event, the molding material enters the groove 5 by the action of pressure in the mold but does not enter capillary spaces between individual bristles or between bristles and tuft holes 101. In the embodiment shown in FIG. 16(c), the tuft holes 101 are formed by a slidable sleeve 104, and this sleeve 104 is guided in a throughhole 105 disposed in the first mold member 100 densely and slidably on the outer circumferential surface. The sleeve 104 has a cone-shaped tapered portion at the free-end surface, and the thick portions 31 of the base end portion of tufts 3 is formed toward this tapered portion. Pulling back the tufts 3 before the molding cavity 140 is filled with the molding material or before the material being filled is solidified can seal the opening edge of the sleeve 104 by the thick portions 31.

Figure 17:
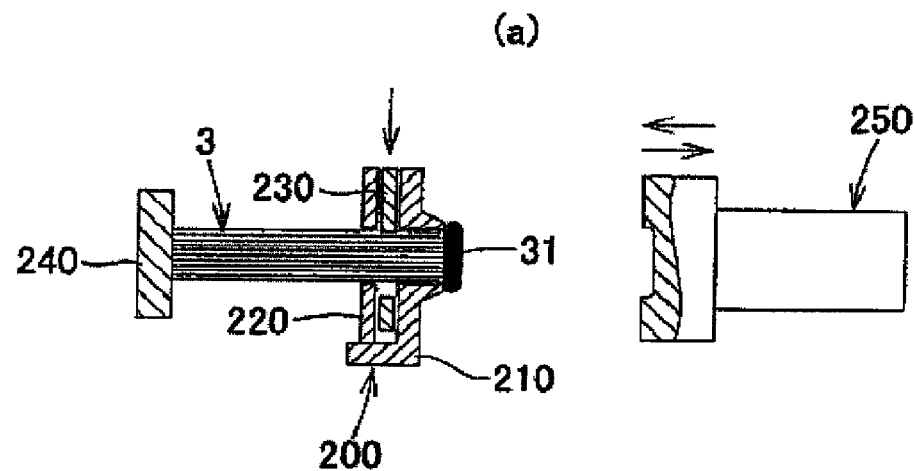
FIGS. 17(a) to 17(c) are illustrations of a toothbrush manufacturing process by another insert process.
Figure 17:
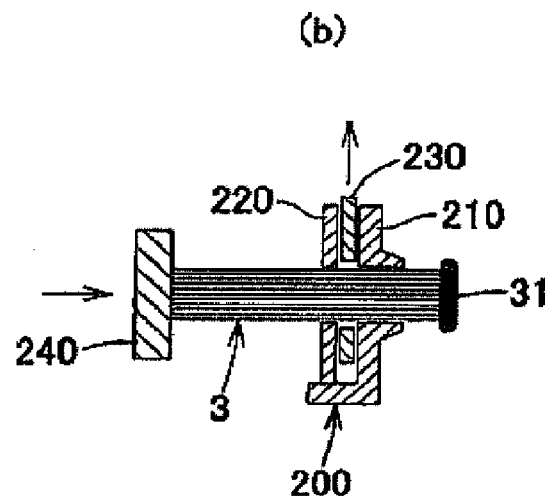
Figure 17:
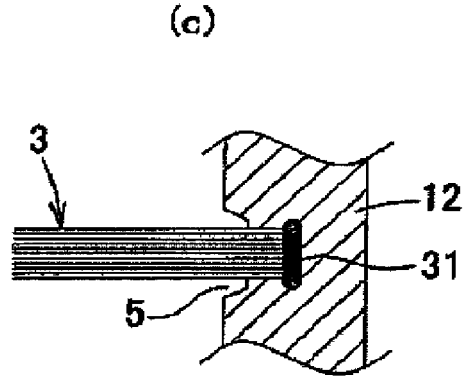

FIG. 17 shows a method stipulated in National Publication of Translated Version No. H9-512724 (Patent document 9) of a toothbrush manufacturing methods by the insert process same as above. In this method, two porous plates 210 and 220 are disposed with a spacing left mutually therebetween in a tuft cusset 200, and between these porous plates 210 and 220, a tightening plate 230 which is movable in an arrow direction in the figure is disposed. In this method, first of all, with the tightening plate 230 held open, tufts 3 are guided into holes of porous plates 210 and 220 as well as the hole of the tightening plate 230 until they protrude in a predetermined volume from the porous plate 210 by being pressed by a backplate 240. Then, as shown in FIG. 17(a), the tightening plate 230 is closed, a heating device 250 is moved to the protruded end portion of the tufts 3, the base end portion 3b of the tufts 3 is heated with the heating device brought into contact or not brought into contact, and melted to form the thick portions 31. Then, as shown in FIG. 17(b), the tightening plate 230 is moved to the opening position and at the same time the tufts 3 are further pressed and positioned into a cavity not illustrated by the backplate 240, the tightening plate is moved to the closed position again, and the holes are filled with molding material. By this, as shown in FIG. 17(c), the thick portions 31 is embedded in the inside of the bristle base 12 with the groove 5 formed around the tufts 3, and a toothbrush is obtained with the tufts 3 bonded to the bristle base 12.

Figure 18:
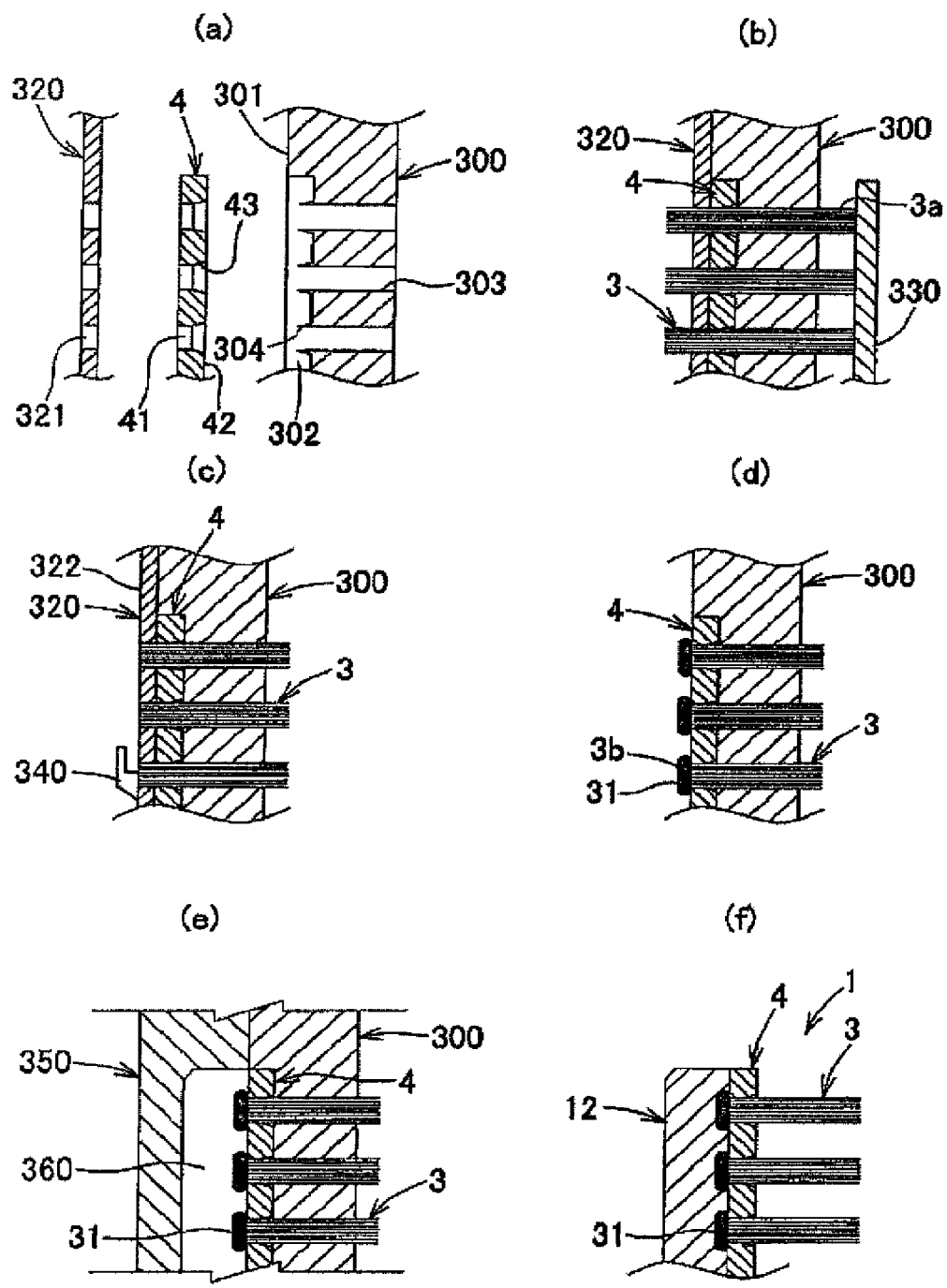
FIGS. 18(a) to 18(f) are illustrations of a toothbrush manufacturing process by an insert process using a bristled part cover.

In addition, FIG. 18 shows a method stipulated in Japanese Unexamined Patent Publication No. 2003-102552 (Patent document 11) of a toothbrush manufacturing methods by the insert process as is the case with the foregoing. In FIG. 18(a), reference numeral 300 denotes a first mold member which is one party of the injection molding molds which have a pair of mold members that form a cavity to form a brush main body 10 of a toothbrush, and recessed portions 302 for mounting a bristled part cover 4 is formed in the cavity-side inner surface 301. In addition, to the recessed portions 302 for mounting the bristled part cover, a plurality of tufts holding holes 303 which correspond to the implanting positions of a plurality of tufts 3 which bundle a large number of bristles 2 are provided, and around the cavity-side opening section of each tuft holding hole 303, tubular protrusions 304 are formed. In addition, reference numeral 4 shows a bristled part cover integrally secured to the surface of the bristle base 12 of the toothbrush, which is formed by injection molding, etc. in advance by molding material such as synthetic resin or thermoplastic elastomer, etc. To the bristled part cover 4, a plurality of tuft holes 41 that agree with the tuft holding holes 303 of the first mold member 300 are formed, and to the opening edge of the surface 42 on the first mold member 1 side in each tuft hole 41, a tapered annular recessed portion 43 which comes in close contact with the tubular protrusion 302 formed around the tuft holding hole 303 of the first mold member 300 is formed. And this tuft hole 41 of the bristled part cover 4 is brought in line with the tuft holding hole 303 of the first mold member 300, the annular recessed portion 43 around the tuft hole 41 is concavoconvexly fitted to the tubular protrusion 304 around the tuft holding hole 303 to mount the bristled part cover 4 into the recessed portion 302 for mounting the bristled part cover of the first mold member 300 in a nearly close-contact state, and fixed to the cavity side of the bristled part cover 4 with the cutting plate 320 mounted. To this cutting plate 320, a plurality of tuft insertion holes 321 that agree with the tuft holding hole 303 of the first mold member 300 and the tuft hole 41 of the bristled part cover 4 are formed.

After the premolded bristled part cover 4 and the cutting plate 320 are mounted and fixed to the cavity-side inner surface 301 of the first mold member 300 as described above, as shown in FIG. 18(b), tufts 3 which have a large number of bristles 2 are supplied from the tapered free-end side, and after inserting them through tuft insertion holes 321 of the cutting plate 320, implanting holes 41 of the bristled part cover 4, and the tuft holding holes 303 of first mold member 300, the free-ends of tufts 3 are brought in contact with the backplate 330 to align the free end portion 3a of the bristles 2, and after adjusting the brush surface formed by the free-ends of bristles 2 to a predetermined shape, each tuft 3 is cut by a cutter 340 along a cavity-side surface 322 in the cutting plate 320 as shown in FIG. 18(c), and the protrusion length of tufts 3 to the cavity side is aligned. Thereafter, the cutting plate 320 is removed, and as shown in FIG. 18(d), the cavity-side protruded end portion (base end portion 3b) of each of the tufts 3 is melted to form the thick portion 31. The thick portion 31 is formed by heat-melting of synthetic resin filament with contact or without contact by a heat source which has heated the synthetic resin filament of bristles 2 that compose the tufts 3 to a meltable temperature with the mold open or by introducing air or inert gas heated to a temperature that can melt the filament with the mold closed. The thick portion 31 is preferably formed to be larger than the hole diameter of the tuft hole 41 of the bristled part cover 4. In the case of melting the filament without contact by the heat source or in the case of melting the filament by heated air or inert gas, it is difficult to adjust the thickness of the thick portions 31 as the molten filament becomes a ball. On the other hand, in the case of forming the thick portions 31 by thermally melting the filament F by bringing the heat source in contact with the filament, it is possible to reduce the thickness by pressing the heat source to the molten mass, and it is also easy to adjust the thickness, and therefore, the thickness of the whole bristled part in a toothbrush can be reduced. After forming the thick portions 31 at the cavity-side protruded end portion of tufts 3 as described above, the second mold member 350 is adjusted to the first mold member 1 of the injection molding mold to form a cavity 360 to integrally form the bristle base 12, the neck 13, and the block handle 14 of the brush main body 10, the molten synthetic resin material as molding material is injected and filled into the cavity 360 to embed the base end portion of tufts 3 with the thick portions 31 formed in the molding material of the bristle base 12, and the bristled part cover 4 is integrally secured to the molding material of the bristle base 12. Thereafter, the first mold member 300 and the second mold member 350 of the injection molding mold are opened and at the same time, the tufts 3 are pulled out from the tuft holding hole 303 of the first mold member 300, and a tooth brush 1 formed with the tapered free end aligned is taken out as shown in FIG. 18(f).

According to the toothbrush manufacturing method as described above, because the bristled part cover 4 is mounted to the cavity-side inner surface 301 of the first mold member 300 with the tuft holding holes 303 provided when filling the molding material into the cavity 360, the thick portion 31 of the tufts 3 base end portion embedded to the bristle base 12 has at least the implanted depth greater than the thickness of the bristled part cover 4 secured and the uprightness is maintained. Furthermore, as is the case with the above-mentioned embodiment, forming a tubular protrusion 304 around the tuft holding hole 303 that is open to the cavity-side inner surface 301 of the first mold member 300 and providing an annular recessed portion 43 that comes in close contact with the tubular protruded portion 304 around the tuft hole 41 of the bristled part cover 4 mounted to the cavity-side inner surface 301 can prevent the leaked molding material from being exposed directly to the surface of the bristled part cover 4 because the tuft holding hole 303 is open to the inside of the bristled part cover 4 even if the molding material leaks to the tuft holding hole 303 of the first mold member 300 via the tuft hole 41 of the bristled part cover 4. In addition, by the concavoconvex fitting between the tubular protruded part 304 provided in the first mold member 300 and the annular recessed portion 42 provided in the bristled part cover 4, positioning of the bristled part cover 4 becomes easy when the bristled part cover 4 is mounted to the cavity-side inner surface 301 of the first mold member 300 and at the same time, the bristled part cover 4 can be reliably mounted.

Figure 19:
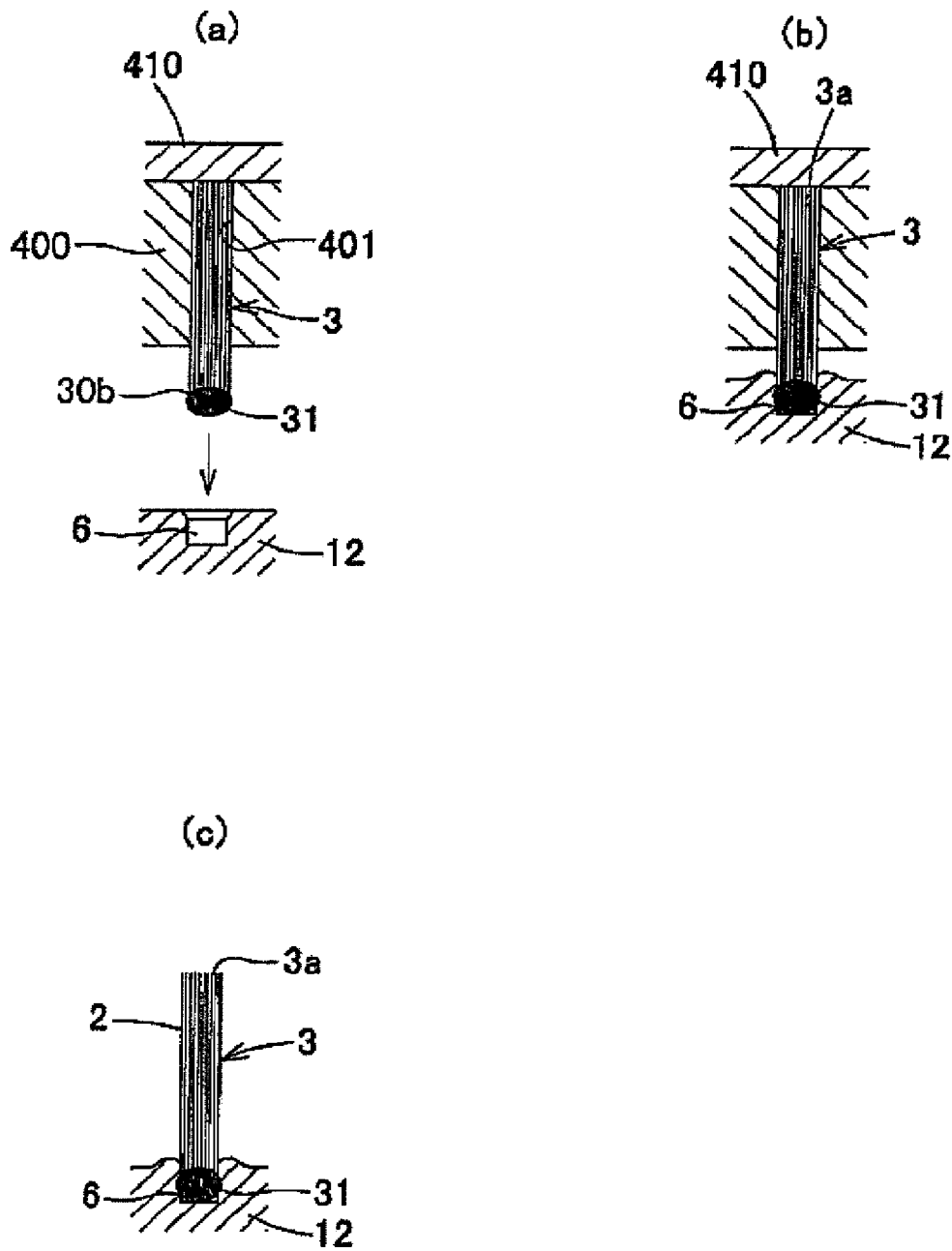
FIGS. 19(a) to 19(c) are illustrations of a toothbrush manufacturing process by a fuse-in process.

FIG. 19 shows a toothbrush manufacturing method by the fuse-in process disclosed in Japanese Unexamined Patent Publication No. H2-99002 (Patent document 12). In this method, tuft holes 6 are formed in advance to a bristle base 12 of a brush main body 10. On the other hand, the tufts 3 secured to the bristle base 12 are inserted into housing holes 401 of the tuft holding member 400 from the tapered free-end side, and with the tufts in contact with the backplate 410 and the free ends of bristles 2 aligned, the base end portion of the tufts 3 is heated and melted by various kinds of heating method described above, and thick portions 31 is formed. And while the thick portions 31 is in the molten state, as shown in FIG. 19(b), tufts are press-fitted into a tuft hole formed in the bristle base 12 of the brush main body 10. In such event, the bristled surface 12a around the tuft hole 6 is softened by heat of the thick portion 31 which is in the molten state by high temperature and at the same time, rises by the pressure-fitting of the thick portion 31 into the tuft hole 6, closing the opening edge of the tuft hole 6. Thereafter, cooling and hardening of the thick portion 31 inserted in the tuft hole 6 thermally fixes the tufts 3 including tapered bristles 2 to the thick portion 31 formed at the base end portion as shown in FIG. 19(c).

Figure 20:
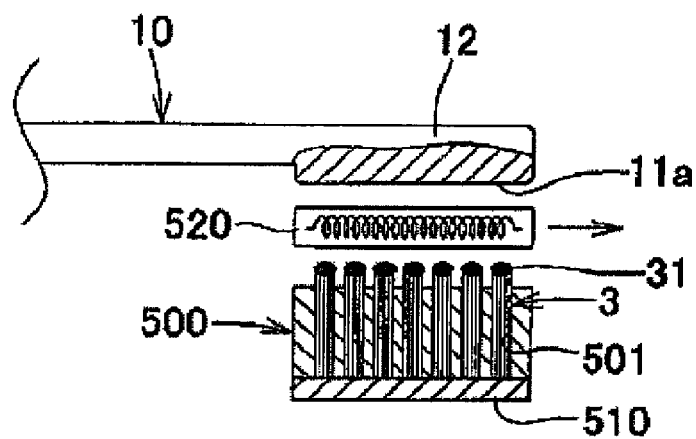
FIGS. 20(a) to 20(c) are illustrations of a toothbrush manufacturing process by a fuse-in process.
Figure 20:
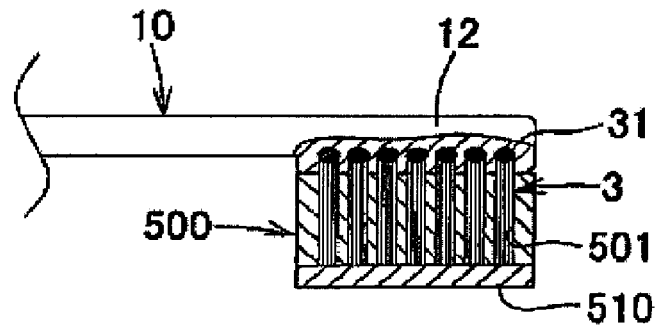
Figure 20:
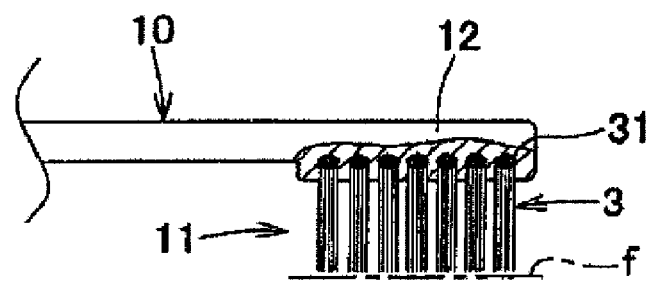

FIG. 20 shows a toothbrush manufacturing method by the fuse-in process same as that described above, and is a process prescribed in Examined Patent Publication (Kokoku) No. H6-46962. In this method, tufts 3 having a large number of bristles 2 are allowed to pass tuft-holes 501 of a tuft holding body 500 with a distance provided from a bristle base 12 of a brush main body 10, the tapered free-end side 3a is brought in contact with a backplate 510 and the brush surface f formed with free-ends of bristles 2 is aligned to a predetermined shape. Then, the bristled surface (surface) 12a of the bristle base 12 and the base end portion 3b of the tufts 3 are melted by a plate-form heater 520 disposed between the both. The heater 520 moves between the bristle base 12 and the tufts 3 and melts the base end portion of tufts 3 and the bristled surface 12a of the bristle base 12, and then retracts. By melting the base end portion 3b of the tufts 3, thick portions 31 are formed. Under this condition, the tuft 3 and the bristle base 12 are brought closer, and the enlarged thick portions 31 are pressed into the molten bristled surface 12a of the bristle base 12; then, the molten portion flows into the back of the thick portions 31 as if it surrounds this, and the tufts 3 are secured to the bristle base 12. By this, as shown in FIG. 20(c), a toothbrush with the tufts 3 thermally secured to the bristle base 12 with the brush surface f formed at the free ends of bristles 2 adjusted to a predetermined shape can be obtained.

Figure 21:
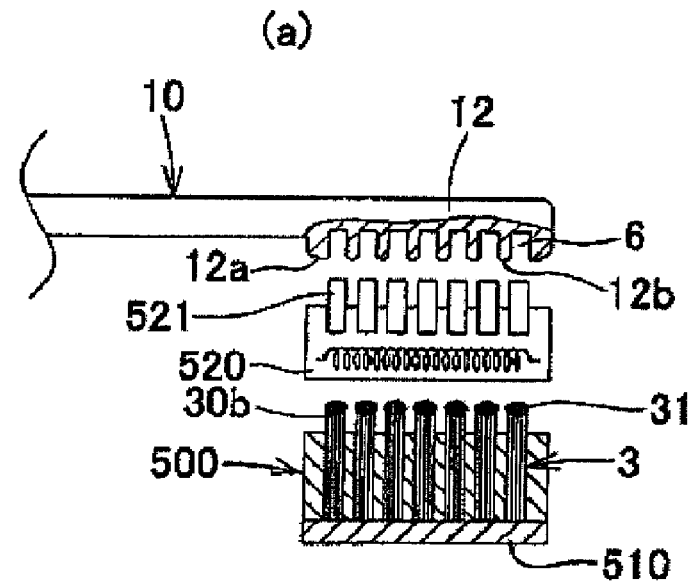
FIGS. 21(a) to 21(c) are illustrations of a toothbrush manufacturing process by a fuse-in process.
Figure 21:
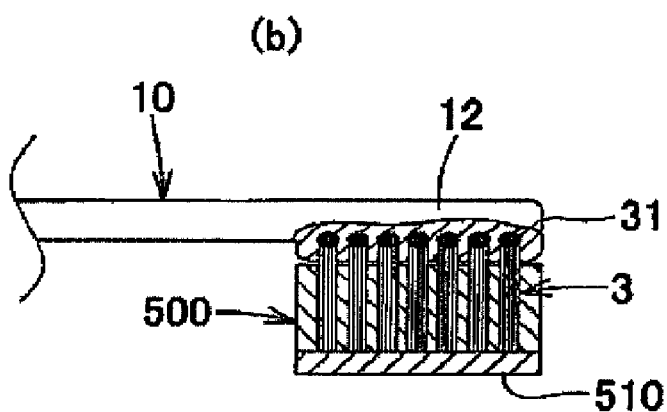
Figure 21:
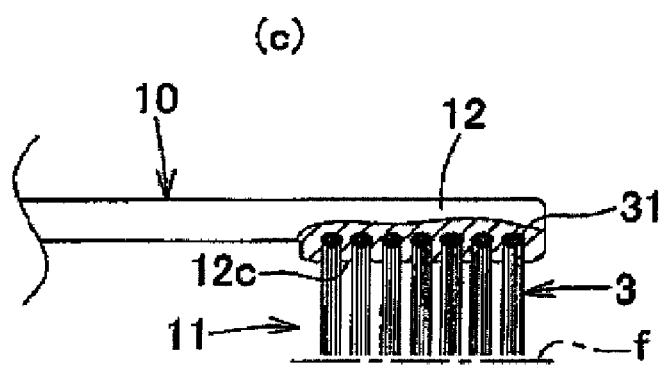

FIG. 21 shows another embodiment of a toothbrush manufacturing method by the fuse-in process. In such event, tuft holes 6 are provided in advance to a bristled surface 12a of a bristle base 12 or as shown in FIG. 21(a), a toothbrush is manufactured by a heater 520 which has individual pin-shape heaters 521. In this method, when the bristled surface 12a of the bristle base 12 is melted, the molten molding material is eliminated towards the outside to an annular edge 12b protruded from the bristled surface 12a of the bristle base 12 and at the same time, the base end portion of tufts 3 is melted to form thick portions 31 in the same manner as described above. After the heater 510 is retracted, the bristle base 12 is brought close to the tufts 3, and a further shown in FIG. 21(b), the thick portions 31 are press-fitted to the tuft holes 6. By this, the molten material of the annular edge 12b flows into the back of the thick portions 31 as if it surrounds this, and as shown in FIG. 21(c), a toothbrush with a swollen portion 12c formed around the relevant tufts 3 on the bristled surface 12a of the bristle base 12 can be obtained.

Figure 22:
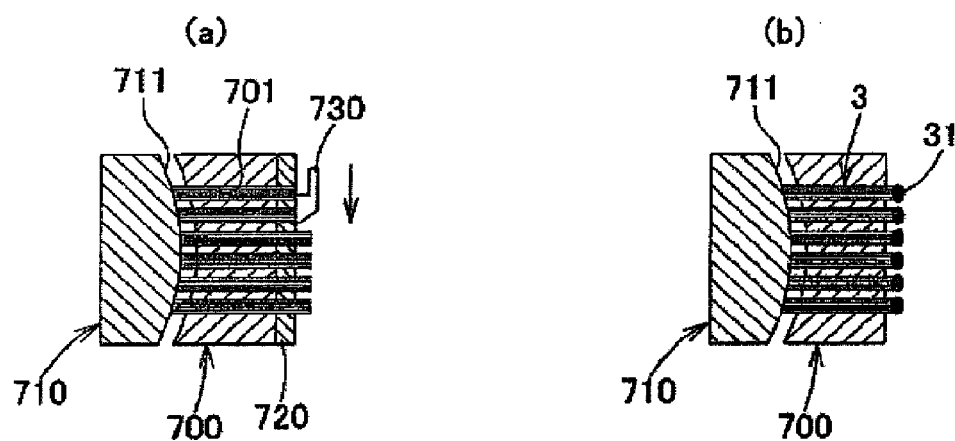
FIGS. 22(a) and 22(b) are illustrations of a method for forming a brush surface into a specified shape.

Because the toothbrush related to the present invention has bristles 2 tapered in advance thermally secured to the bristle base of the brush main body 10 with the free ends aligned by the insert process, fuse-in process, etc., it is possible to form the brush surface f formed by the bristles 2 into an optional shape. That is, when the bristles 2 (tufts 3) are secured to the bristle base 12, the brush surface f can be formed into an optional shape that conforms to the shape of the backplate for aligning the free ends of the bristles 2. For example, as shown in FIG. 13, in the event that the brush surface f is formed into a curved shape in which the bristles are high in the circumference of the bristled part 11 and are low at the center, as shown in FIG. 22(*a*), the tufts 3 are inserted into tuft holes 701 of a tuft holding member 700, and using a backplate 710 whose front surface 711 in contact with the free-end side of the tufts 3 is formed into a desired curved shape, the shape of the bristled surface composed with bristles 2 is adjusted; then, the base end portion side of the tufts 3 protruded from the tuft holding member 700 is trimmed. In such event, a cutting plate 720 is piled over the tuft holding member 700, the free ends of the bristles 2 are brought in contact with the backplate 710 and aligned; then, the base end portion of the tufts 3 is cut by a cutter 730 along a surface of the cutting plate 720, and the tufts 3 which protrude from the tuft holding member 700 can be easily trimmed Thereafter, as shown in FIG. 22(*b*), by a suitable means described above, the base end portion of the tufts 3 is heated and melted to form the thick portions 31, and the tufts 3 are secured to the bristle base 12 by the in-mold process, fuse-in process, etc. By this, a toothbrush with the brush surface f formed into an optional shape, such as a toothbrush with the brush surface f curved as shown in FIG. 13, etc. can be manufactured.

Figure 23:
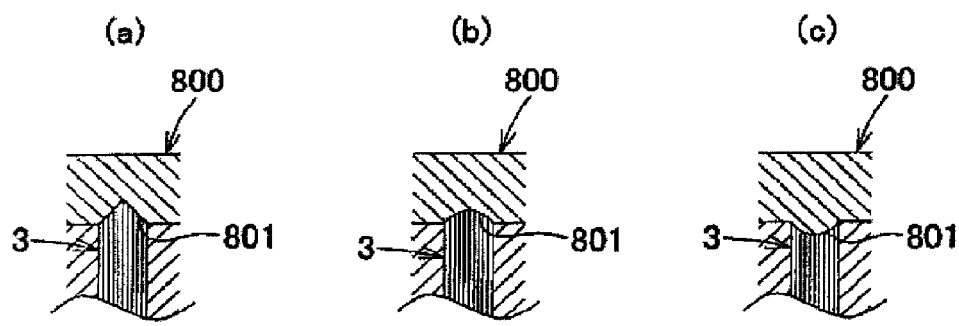
FIGS. 23(a) to 23(c) are illustrations of a method for forming a free end of the bristle tuft to a specified shape.

With respect to the free-end shape of each tuft 3, for example as shown in FIGS. 23(*a*) to 23(*c*), a contact surface 801 of a backplate 800 that aligns the free ends of bristles 2 in contact with tufts 3 may be formed into a conical shape, dish shape, etc. and the free-end shape of the tuft 3 can be formed into any optional shapes.

Description has been made on a manually operated toothbrush 1 which has a long block handle 14 but the toothbrush of the present invention can be applied as a brush of electrically operated toothbrushes, whose block handle is formed short and which is mounted to a brush main body equipped with a drive means to vibrate the bristled part 11.

EXAMPLES

The cleaning capabilities and strength were evaluated for toothbrushes of various specifications as follows (1) Toothbrush Specifications Used for Evaluation The shape of the tuft hole is circular and whose diameter is 1.7 mm. Evaluations were made using a toothbrush which had a total of 21 holes, with 3 rows of tuft holes located along an axis parallel to the longitudinal axis direction of the block handle and with 7 tuft holes provided in each row. The thickness of bristle base, bristles, and bristles implanting method were chosen in conformity to the numerical values shown in Table 1. In addition, bristle length sometimes varied greatly but bristles were trimmed to 10 mm as much as possible.

(2) Evaluation Method of Cleaning Efficacy

Test Method

Ten subjects were asked to brush teeth for 3 minutes with each toothbrush, and the amount of plaque adhering to the second molar before and after brushing was measured by the Suzuki Method "Journal of Japanese Society of Dental Health, 20(3), 9(1971)" and the removal ratio (%) was calculated. The Suzuki Method is a method to measure plaque adhering to the tooth surface by the distance from the gum line.

Evaluation Criteria

The cleaning capabilities were evaluated by following evaluation criteria. Table 1 shows the results.

⊚: 90% or more
○: 85% or more
Δ: 80% or more
x: less than 80%

(3) Evaluation Method of Strength

Test Method

The portion where fingers came in contact with the toothbrush was fixed, and 1 kg load was repeatedly applied from the bristled part side to the bristled part center at 0.4 Hz frequencies until the bristled part broke. The number of repetitions was counted.

Evaluation Criteria

The strength was evaluated by the use of the following evaluation criteria. Table 1 shows the results.

⊚: 50,000 times or more
○: 30,000 times or more and less than 50,000 times
Δ: 10,000 times or more to less than 30,000 times
x: less than 10,000 times

TABLE 1

Evaluations of cleaning capabilities and strength

| | | Bristles | | | | | |
| --- | --- | --- | --- | --- | --- | --- | --- |
| | Implanting method | Bristle base thickness (mm) | Form | Number of free-end splits | FIG. | Cleaning capabilities | Strength |
| Example 1 | Anchorless | 4.0 | Core-sheath split | 3 | FIG. 5 | ○ | ⊚ |
| Example 2 | Anchorless | 3.5 | Core-sheath split | 3 | FIG. 5 | ⊚ | ⊚ |
| Example 3 | Anchorless | 3.0 | Core-sheath split | 3 | FIG. 5 | ⊚ | ○ |
| Example 4 | Anchorless | 3.0 | core-sheath | 1 | FIG. 7 | ⊚ | ○ |
| Example 5 | Anchorless | 3.0 | Single-layer tapered split free-end | 4 | FIG. 4(e) | ⊚ | ○ |
| Comparative example 1 | Anchor | 5.0 | Core-sheath split | 3 | FIG. 5 | Δ | ⊚ |
| Comparative example 2 | Anchor | 5.0 | core-sheath | 1 | FIG. 7 | Δ | ⊚ |
| Comparative example 3 | Anchor | 5.0 | Single-layer tapered split free-end | 4 | FIG. 4(e) | Δ | ⊚ |

TABLE 1-continued

Evaluations of cleaning capabilities and strength

| | Implanting method | Bristle base thickness (mm) | Bristles Form | Number of free-end splits | FIG. | Cleaning capabilities | Strength |
|---|---|---|---|---|---|---|---|
| Comparative example 4 | Anchorless | 3.0 | Regular bristles (single layer) | 1 | — | X | ○ |
| Comparative example 5 | Anchor | 5.0 | Regular bristles (single layer) | 1 | — | X | ⊚ |
| Comparative example 6 | Anchorless | 3.0 | Single-layer tapered free-end | 1 | *1 | Δ | ○ |
| Comparative example 7 | Anchor | 5.0 | Single-layer tapered free-end | 1 | *1 | Δ | ⊚ |

*1: Japanese Unexamined Patent Publication No. H6-141923

(4) Discussion

Figure 4:
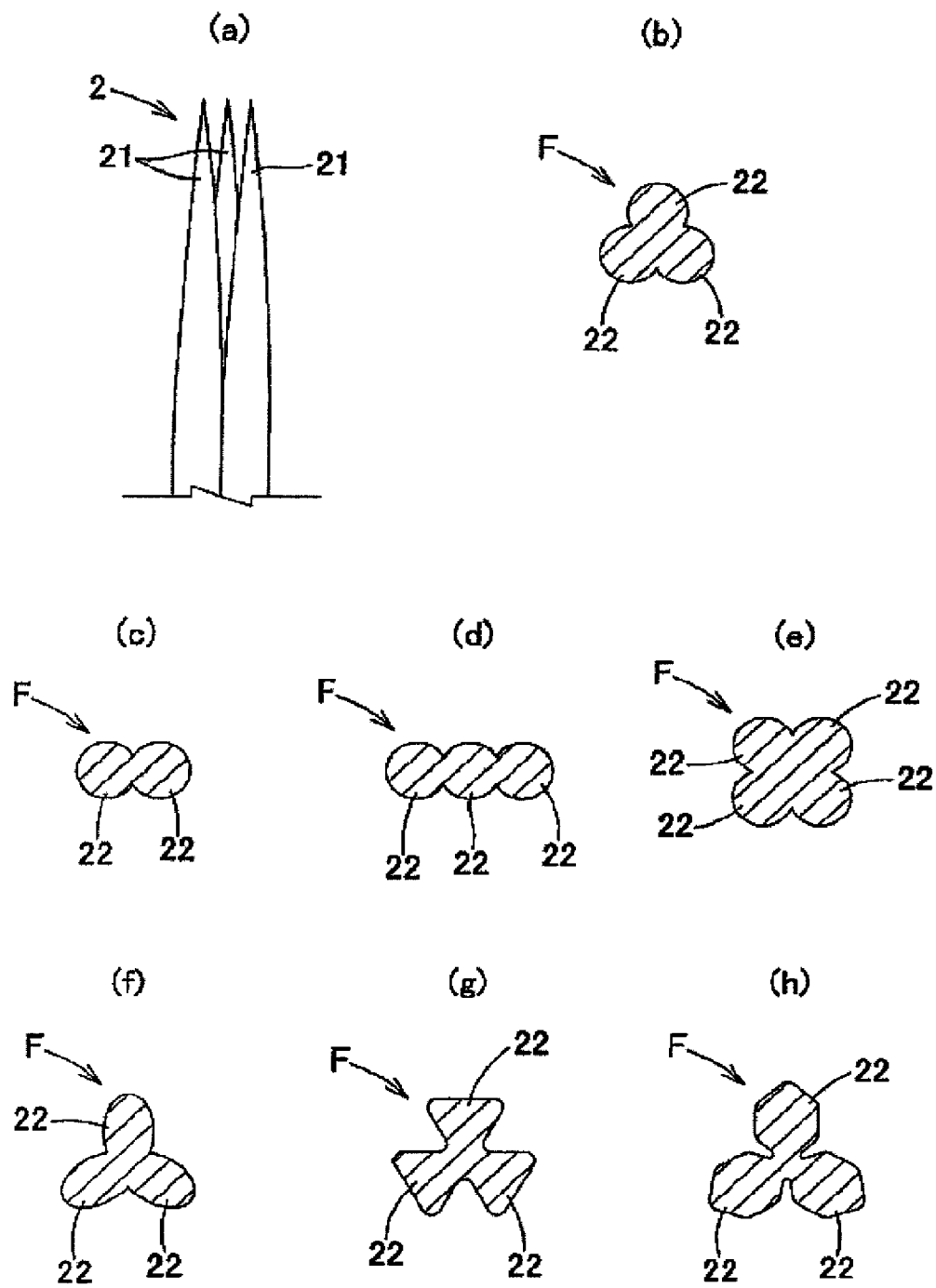
FIG. 4(a) is an enlarged view of a free end portion of split bristles and FIGS. 4(b) to 4(h) are cross-sectional views of split bristle filaments.

The results of examples 1 to 5 indicate that toothbrushes which have bristles of FIGS. 4(*e*), 5 and 7 implanted without anchor achieve remarkably high cleaning capabilities at the second molar which is the risky portion subject to dental diseases and is difficult to clean. On the other hand, the results of comparative examples 4 to 7 indicate that in the event that bristles are regular bristles (single layer) or single-layer free-end tapered bristles, not satisfactory cleaning capabilities were observed at each portion irrespective of anchorless implantation and anchor implantation. Furthermore, as viewed in comparative examples 1 to 3, even if the bristles of FIGS. 4(*e*), 5, and 7 are used, it is unable to reduce the thickness of the bristle base, and therefore, with the second mortar where the accessibility and the operability at the site have large influence on the effects, satisfactory cleaning effects are unable to be obtained.

INDUSTRIAL APPLICABILITY

Because the toothbrush according to the present invention has a thin bristle base with bristles implanted by an anchorless implantation method, as compared to toothbrushes with bristles implanted by the use of anchor, the toothbrush head can be freely handled in the oral cavity. Consequently, the toothbrush head can be smoothly moved to the position suited to clean the portion which is likely to be left unbrushed and which is highly subject to risk of dental diseases, and in the cleaning action at the position, the toothbrush can achieve a high degree of operating freedom, and the motion of bristles that remove dental plaque becomes effective, and the plaque removing capabilities can be increased. In addition, because in the present invention, tapered bristles are used for toothbrush bristles, according to the present invention, a toothbrush which has excellent suitability for bristle insertion into narrow portions subject to high risk of dental diseases such as the gaps between neighboring teeth and gaps between the teeth and the gums, and which is highly effective in removing dental plaque can be provided.

The invention claimed is:

1. A method for manufacturing a toothbrush with the following steps:
    (a) providing bristles made of a thermoplastic resin;
    (b) wherein at least some of the bristles comprise tapered bristles with a sectional shape having an islands in a sea structure wherein a core bristle having a plurality of island portions exposed beforehand at a free end, and
    (c) subsequently inserting a tuft comprising a plurality of the bristles into tufts holding holes formed in a first mold member from a front end side of the bristles against an opposite side from a cavity side, then bringing a free end portion of the tuft in contact with a backplate, setting a brushing surface formed by end portions of the bristles at a predetermined shape, heat melting a base end of the tuft to form a thick portion comprising a fused mass at the base end of the tuft, then mounting the thick portion in such that the tuft is fusion-bonded to a bristle base, and forming a brush main body made of a synthetic resin with the bristle base in molds.

2. The method according to claim 1,
    wherein the bristle base is not more than 4.0 mm thick.

3. The method according to claim 1,
    wherein each of the tapered bristles are synthetic resin filaments each with a sectional shape composed of a plurality of connected unit cross-sectional elements.

4. The method according to claim 1,
    wherein each of the tapered bristles is formed in a tapered shape in which the sheath portion or sea portion becomes thinner towards the free end and is a split bristle with a plurality of core bristles exposed at the free end.

5. The method according to claim 1,
    wherein each of the tapered bristles is formed in a tapered shape in which the sheath portion or sea portion becomes thinner towards the free end and is a tapered bristle with a single core bristle exposed at the free end.

6. The method according to claim 5,
    wherein the cross-sectional shape of each of the core bristles of the tapered bristles exposed at the free end has a nearly same shape throughout the length in the axial direction of the core bristle.

7. The method according to claim 1,
    wherein each of the bristles is made of a material containing at least one kind of thermoplastic resin selected from polyester resin, polyamide resin, and polyolefin resin.

8. The method according to claim 1,
    wherein in each of the tapered bristles, a main component of the material of the core or island is a polyamide resin, and a main component of the material of the sheath or sea portion is a polyester resin.

9. The method according to claim 1,
wherein the bristled part comprises at least two or more kinds of bristles of different specifications.

10. The method according to claim 9,
wherein the bristled part is formed by implanting at least two or more kinds of tapered bristles of different specifications.

11. The method according to claim 1, wherein the tapered bristles are implanted to at least part of a front end portion, right-side surface portion, center portion, left-side surface portion, and rear end portion of the bristled part.

12. The method according to claim 1,
wherein a brush surface composed of the free ends of the bristles in the bristled part is not flat.

13. The method according to claim 12,
wherein the brush surface has irregularities.

14. The method according to claim 13,
wherein the brush surface has irregularities in both the length direction and the width direction of the bristled part.

15. The method according to claim 1,
wherein the bristles are fused to the bristle base of the brush main body by an in-mold process or fused-in process.

16. The method according to claim 1,
wherein, in the process (c), in a state that a cutting plate is overlapped at a cavity side of a first mold member, inserting a tuft comprising a plurality of the bristles into tuft insertion holes formed in a cutting plate and tufts holding holes formed in the first mold member from end side of the bristles against an opposite side from a cavity side, then bringing a free end portion of the tufts in contact with a backplate, setting a brushing surface formed by end portions of the bristles at a predetermined shape, cutting a base portion of the tufts along the cutting plate, then removing the cutting plate, heat melting a base end of the tuft to form a thick portion comprising a fused mass at the base end of the tuft, then mounting the thick portion in such that the tuft is fusion-bonded to a bristle base, and forming a brush main body made of a synthetic resin with the bristle base in molds.

17. The method according to claim 1,
wherein, in the process (c), in a state that a bristled part cover and a cutting plate are overlapped at a cavity side of a first mold member, inserting a tuft comprising a plurality of the bristles into a tuft hole formed in the bristled part cover, tuft insertion holes formed in a cutting plate and tufts holding holes formed in the first mold member from end side of the bristles against an opposite side from a cavity side, then bringing a free end portion of the tufts in contact with a backplate, setting a brushing surface formed by end portions of the bristles at a predetermined shape, cutting a base portion of the tufts along the cutting plate, then removing the cutting plate, heat melting a base end of the tuft to form a thick portion comprising a fused mass at the base end of the tuft, then mounting the thick portion in such that the tuft and the bristled part cover are fusion-bonded to a bristle base, and forming a brush main body made of a synthetic resin with the bristle base in molds.

* * * * *